US012367816B1

(12) United States Patent
Lam et al.

(10) Patent No.: US 12,367,816 B1
(45) Date of Patent: Jul. 22, 2025

(54) ROW-SHIFT FRAME-ROTATE DRIVING METHOD FOR SEQUENTIAL DRIVING MICROLED DISPLAY PANEL

(71) Applicant: OMNIVISION TECHNOLOGIES, INC., Santa Clara, CA (US)

(72) Inventors: Hing Mo Lam, Cupertino, CA (US); Sunny Yet-san Ng, San Jose, CA (US); Liang Zhao, Gilroy, CA (US); Regis Fan, Sunnyvale, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 18/603,005

(22) Filed: Mar. 12, 2024

(51) Int. Cl.
*G09G 3/32* (2016.01)

(52) U.S. Cl.
CPC ....... *G09G 3/32* (2013.01); *G09G 2300/0842* (2013.01); *G09G 2310/0235* (2013.01); *G09G 2320/0626* (2013.01)

(58) Field of Classification Search
CPC ... G09G 2320/0626; G09G 2310/0235; G09G 3/32; G09G 2300/0842
See application file for complete search history.

(56) References Cited

U.S. PATENT DOCUMENTS 8,223,179 B2 7/2012 Kwan et al.
2009/0027360 A1* 1/2009 Kwan ...................... G09G 3/20 345/204
2015/0194101 A1* 7/2015 Yaras .................. G09G 3/3426 345/593
2023/0274719 A1* 8/2023 Kempf .................. G09G 3/002 345/530

* cited by examiner

*Primary Examiner* — Muhammad N Edun
(74) *Attorney, Agent, or Firm* — CHRISTENSEN O'CONNOR JOHNSON KINDNESS PLLC

(57) ABSTRACT

A micro-LED display panel includes a pixel array that includes a plurality of pixels arranged in a plurality of rows and columns, wherein each pixel of the pixel array includes a blue LED, a green LED, and a red LED. The display further includes a frame buffer and a bitplane generator. The bitplane generator is configured to receive display data from the frame buffer and to output a color updating schedule according to the display data. The color updating schedule updates a luminance and a color of the display data for each pixel in the pixel array during each of a plurality of time intervals that define a frame time of a frame. The color updating schedule row-shifts and frame-rotates at least one row of the frame.

17 Claims, 41 Drawing Sheets

400A

400B

500B

600A

600B

600B

700A

*time (tau#)*

*row#*

| tau# / row# | 0 | 1 | 2 | 3 | 4 | 5 | 6 | 7 | 8 | 9 | 10 |
|---|---|---|---|---|---|---|---|---|---|---|---|
| 0 | bp0 | bp0 | bp0 | gp1 | | | | rp1 | | | |
| 1 | bp0 | bp0 | bp0 | gp1 | | | | rp1 | | | |
| 2 | bp0 | bp0 | bp0 | gp1 | | | | rp1 | | | |
| 3 | bp0 | bp0 | bp0 | gp1 | | | | rp1 | | | |
| 4 | bp0 | bp0 | bp0 | gp1 | | | | rp1 | | | |
| 5 | bp0 | bp0 | bp0 | gp1 | | | | rp1 | | | |
| 6 | bp0 | bp0 | bp0 | gp1 | | | | rp1 | | | |
| 7 | bp0 | bp0 | bp0 | gp1 | | | | rp1 | | | |
| 8 | bp0 | bp0 | bp0 | gp1 | | | | rp1 | | | |
| 9 | bp0 | bp0 | bp0 | gp1 | | | | rp1 | | | |
| 10 | bp0 | bp0 | bp0 | gp1 | | | | rp1 | | | |
| 11 | bp0 | bp0 | bp0 | gp1 | | | | rp1 | | | |
| 12 | bp0 | bp0 | bp0 | gp1 | | | | rp1 | | | |
| 13 | bp0 | bp0 | bp0 | gp1 | | | | rp1 | | | |
| 14 | bp0 | bp0 | bp0 | gp1 | | | | rp1 | | | |
| 15 | bp0 | bp0 | bp0 | gp1 | | | | rp1 | | | |

*FIG. 6A*

700B

| row# \ bitplane# | 0 | 1 | 2 | 3 | 4 | 5 | 6 | 7 | 8 | 9 | 10 |
|---|---|---|---|---|---|---|---|---|---|---|---|
| 0 | bp0 | bp0 | bp0 | gp1 | | | | rp1 | | | |
| 1 | | | | bp0 | bp0 | bp0 | gp1 | | | | rp1 |
| 2 | | | rp1 | | | | bp0 | bp0 | bp0 | gp1 | |
| 3 | | gp1 | | | | rp1 | | | | bp0 | bp0 |
| 4 | bp1 | | | | gp1 | | | | rp1 | | |
| 5 | rp0 | rp0 | rp0 | bp1 | | | | gp1 | | | |
| 6 | | | | rp0 | rp0 | rp0 | bp1 | | | | gp1 |
| 7 | | | gp1 | | | | rp0 | rp0 | rp0 | bp1 | |
| 8 | | bp1 | | | | gp1 | | | | rp0 | rp0 |
| 9 | rp1 | | | | bp1 | | | | gp1 | | |
| 10 | gp0 | gp0 | gp0 | rp1 | | | | bp1 | | | |
| 11 | | | | gp0 | gp0 | gp0 | rp1 | | | | bp1 |
| 12 | | | bp1 | | | | gp0 | gp0 | gp0 | rp1 | |
| 13 | | rp1 | | | | bp1 | | | | gp0 | gp0 |
| 14 | gp1 | | | | rp1 | | | | bp1 | | |
| 15 | bp0 | bp0 | bp0 | gp1 | | | | rp1 | | | |

FIG. 6B

ROW-SHIFT FRAME-ROTATE DRIVING METHOD FOR SEQUENTIAL DRIVING MICROLED DISPLAY PANEL

BACKGROUND INFORMATION

Field of the Disclosure

This disclosure generally relates to the design of micro-light emitting diode (micro-LED) displays, and in particular, to micro-LED displays with color updating schedules that eliminate color break up.

Background

Micro-LED displays are widely used in augmented/mixed reality (AR/MR), virtual reality (VR), large video displays, TVs and monitors, automotive displays, mobile phones, smart watches and wearables, tablets, laptops and other applications. The technology for manufacturing micro-LED displays continues to advance at a great pace. For example, demands for micro-LED displays having smaller pixels that are closer together for greater image quality motivate further miniaturization and integration of micro-LEDs in display devices.

Micro-LED screens are made up of micrometer-sized LED lights. These lights are used to directly create color pixels. By having thousands or more LED lights, high-quality images and video may be displayed without the need for backlighting.

In some applications, the micro-LEDs exhibit an undesirable phenomena known as color break up (CBU). CBU is caused by the human eye detecting the presence of different subframe colors and associated spacial offsets for objects being displayed. The resulting image can appear as multiple slightly offset images of the object, wherein each image has a different subframe color. Accordingly, systems and methods are needed for improving appearance of the objects on the micro-LED displays.

BRIEF DESCRIPTION OF THE DRAWINGS

Non-limiting and non-exhaustive embodiments of the disclosed subject matter are described with reference to the following figures, wherein like reference numerals refer to like parts throughout the various views unless otherwise specified.

DETAILED DESCRIPTION

Figure 1:
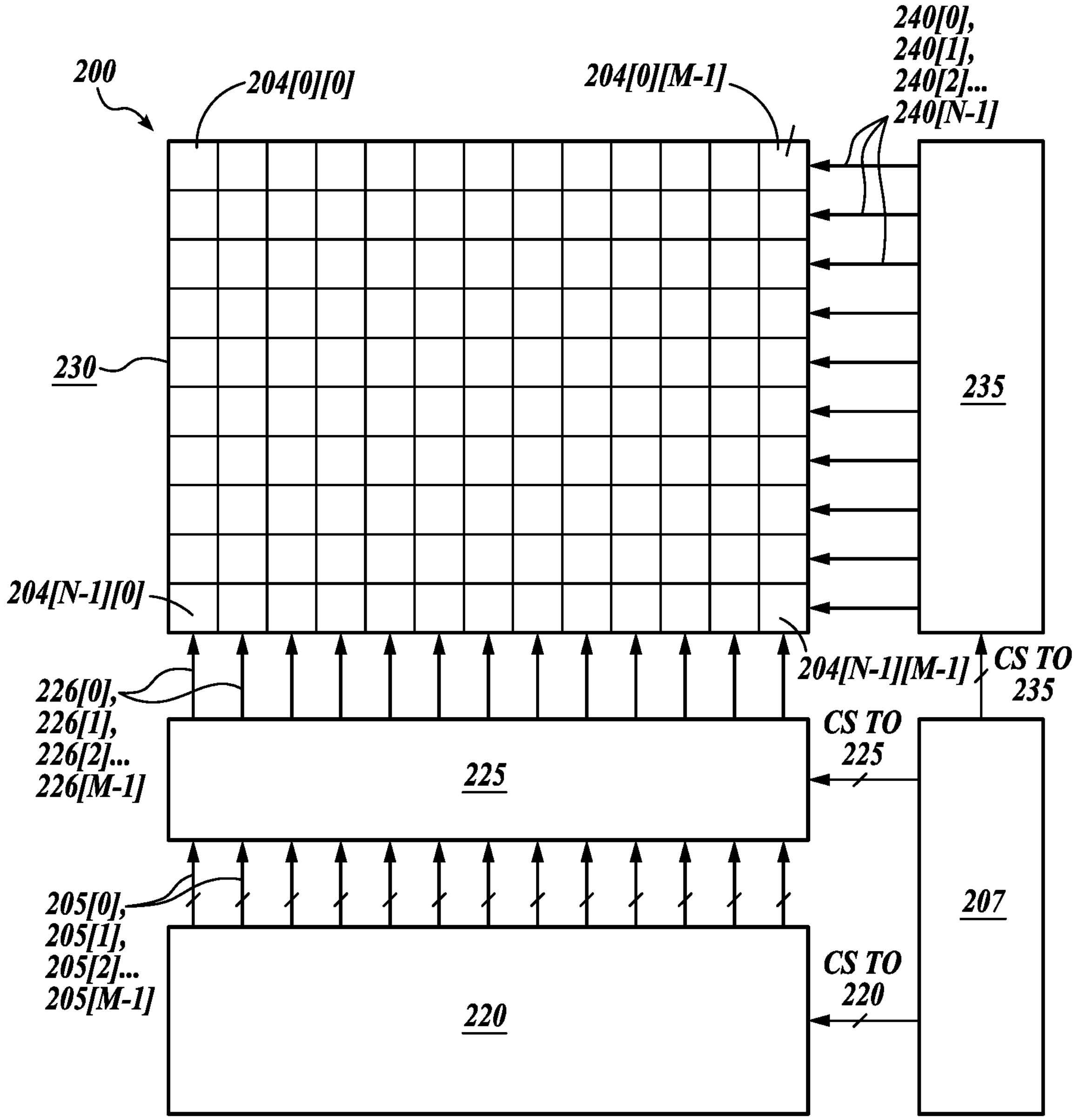
FIG. 1 is an example of a micro-LED display system in accordance with the present technology.

Micro-LED displays, and in particular, micro-LED displays with row-shifted and frame-rotated color updating schedules are disclosed. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Where methods are described, the methods may include more, fewer, or other steps. Additionally, steps may be performed in any suitable order. Accordingly, the disclosure can encompass other embodiments not expressly shown or described herein. In the context of this disclosure, the terms "about," "approximately," etc., mean+/−5% of the stated value.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Briefly, the embodiments of the present technology are directed to micro-LED displays having color updating schedules with row-shifting (or "row-shift") and/or frame-rotation (or "frame-rotate"). The inclusion of row-shifting and/or frame-rotation reduces or eliminates CBU during color updating. In some embodiments, the micro-LED display includes a frame buffer, which transmits display data to a bitplane generator.

FIG. 1 is an example micro-light emitting diode (micro-LED) display system 200, in accordance with the present technology. The micro-LED display 200 includes a frame buffer 220, a bitplane generator 225, a micro-LED display panel 230, a timing controller 207, and a wordline gate driver 235. The micro-LED display panel 230 includes an N×M array of pixels 204[0][0] . . . 204[N−1][M−1]. In the illustrated example, indices n, m correspond to the row and column of pixel circuit in the array of pixel circuits. For the array of pixel circuits N×M, these indices range from 0 to N−1 for the index n, and from 0 to M−1 for the index m.

Each column 204[0][m] . . . 204[N−1][m] of pixels 204 includes a corresponding data line 226[m](also referred to herein as a bitline). Each row 204[n][0] . . . 204[n][M−1] of pixels 204 includes a corresponding scan line 240[n](also referred to herein as a wordline).

The timing controller 207 is configured to transmit control signals (CS) to the frame buffer 220, the bitplane generator 225, and the wordline gate driver 235. The frame buffer 220 receives and stores display data.

In display operation, the frame buffer 220 then transmits display data 205[0] . . . 205[M−1] to the bitplane generator 225 row by row. In some embodiments the display data of each pixel is an 8-bit binary number; however, it will be appreciated that the display data can be a 10-bit binary number or a binary number of any other suitable bit width. The frame buffer 220 may be a static random-access memory (SRAM), dynamic random-access memory (DRAM), or other type of storage element. The frame buffer 220 may transmit data representing all of the pixels 204[0][0] . . . 204[N−1][M−1] in a complete display panel 230.

The bitplane generator 225 converts display data into an image signal or video signal that can be displayed on a monitor, screen, or other display. The bitplane generator 225 receives the display data 205[0] . . . 205[M−1] from the frame buffer 220. The display data 205[0] . . . 205[M−1] is a gray level of each pixel on the display panel 230. The gray level directs the bitplane generator 225 to adjust the luminance of one or more LEDs of each pixel 204 in the display panel 230. The bitplane generator 225 is configured to generate bitplanes, such as shown in FIG. 2B. All the generated bitplanes in a period of one frame form a pulse width modulation (PWM) of all pixels 204 on the display panel 230.

Conventionally, each micro-LED in micro-LED display 200 requires an optimal current to drive, for maximum (quantum) efficiency. The display 200 includes a constant current source to generate the optimal current, then uses PWM, such as the GPWM signal generated by the bitplane generator 225, to control the brightness of 8-bit grayscales of the display data 205[0] . . . 205[M−1].

In order to display an image or video, the bitplane generator 225 sequentially reads out all rows of data (such as 1024 rows) from the frame buffer 220 and switches all bitlines 226[0] . . . 226[M−1] to sequentially write bitplane data onto each row of the pixel array. Conventionally, there is not enough time to switch the bitlines 226[0] . . . 226[M−1] fast enough to accommodate 10-bit dimming after adjusting the luminance of 8-bit grayscale with the bitplane generator 225, because of the impedance of the bitlines 226[0] . . . 226[M−1]. This becomes even more difficult for higher resolution and higher frame rate displays. Switching the bitline 226[0] . . . 226[M−1] also consumes large amounts of power.

In operation, the frame buffer 220 provides display data to the bitplane generator 225. The wordlines 240[0] . . . 240[N−1] select a row of pixels 204[0][0] . . . 204[N−1][M−1] for the bitlines 226[0] . . . 226[M−1] to write to. In some embodiments, the bitplane generator 225 outputs a binary 8-bit grayscale pulse width modulation (GPWM) signal for each pixel on the micro-LED display panel 230 through multiple bitplanes, as shown in FIG. 2B. In this manner, each pixel 204 of the micro-LED display panel 230 is turned on or off according to its value on the bitplane, and the luminance of 8-bit grayscale of each pixel is adjusted.

The full display operation is as follows. The timing controller 207 controls the overall display operation of the display system 200. The timing controller also may control when and what data is going to be written into the pixel circuits 204. The timing controller 207 outputs control signals CS (row address, row address enable, clock) to the wordline gate driver 235, the wordline gate driver 235 turns on (or enables) a row of pixel circuits 204[n][0] . . . 204[n][M−1] via scan lines (or wordlines) 240[0] . . . 240[N−1] for writing in display data on the data lines 226[0] . . . 226[M−1]. At the same time, the timing controller 207 also outputs control signals CS (clock, output enable) to the bitplane generator 225 (or source driver if the display panel 230 is analog driven) to output display data to the data lines 226[0] . . . 226[M−1]. The gray scale (or display data) on the data lines 226[0] . . . 226[M−1] is written into the pixel circuits 204[0][0] . . . 204[N−1][M−1] selected by the scan lines 240[0] . . . 240[N−1]. The gate driver 235 turns off (or disables) the row of pixel circuits 204[0][0] . . . 204[N−1][M−1] after writing the bitplane data into the selected row of pixel circuits 204[0][0] . . . 204[N−1][M−1] is finished, and before removing the bitplane data on the data lines 226[0] . . . 226[M−1]. The display operation is repeated for the next row of pixel circuits till the last row of pixel circuits of the display panel 230.

Figure 2A:
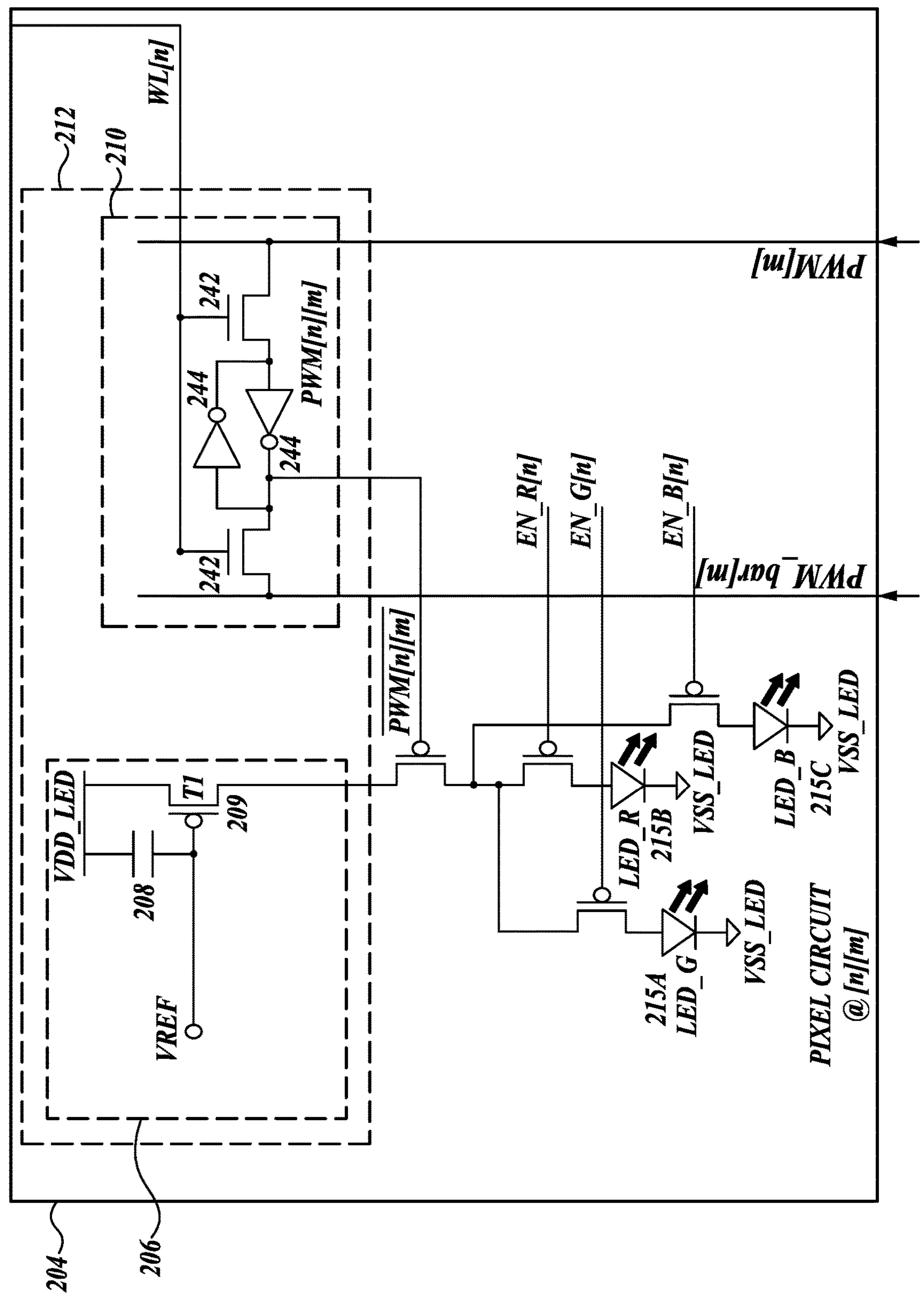
FIG. 2A is a circuit diagram of pixel circuitry of a micro-LED display in accordance with the present technology.
Figure 2B:
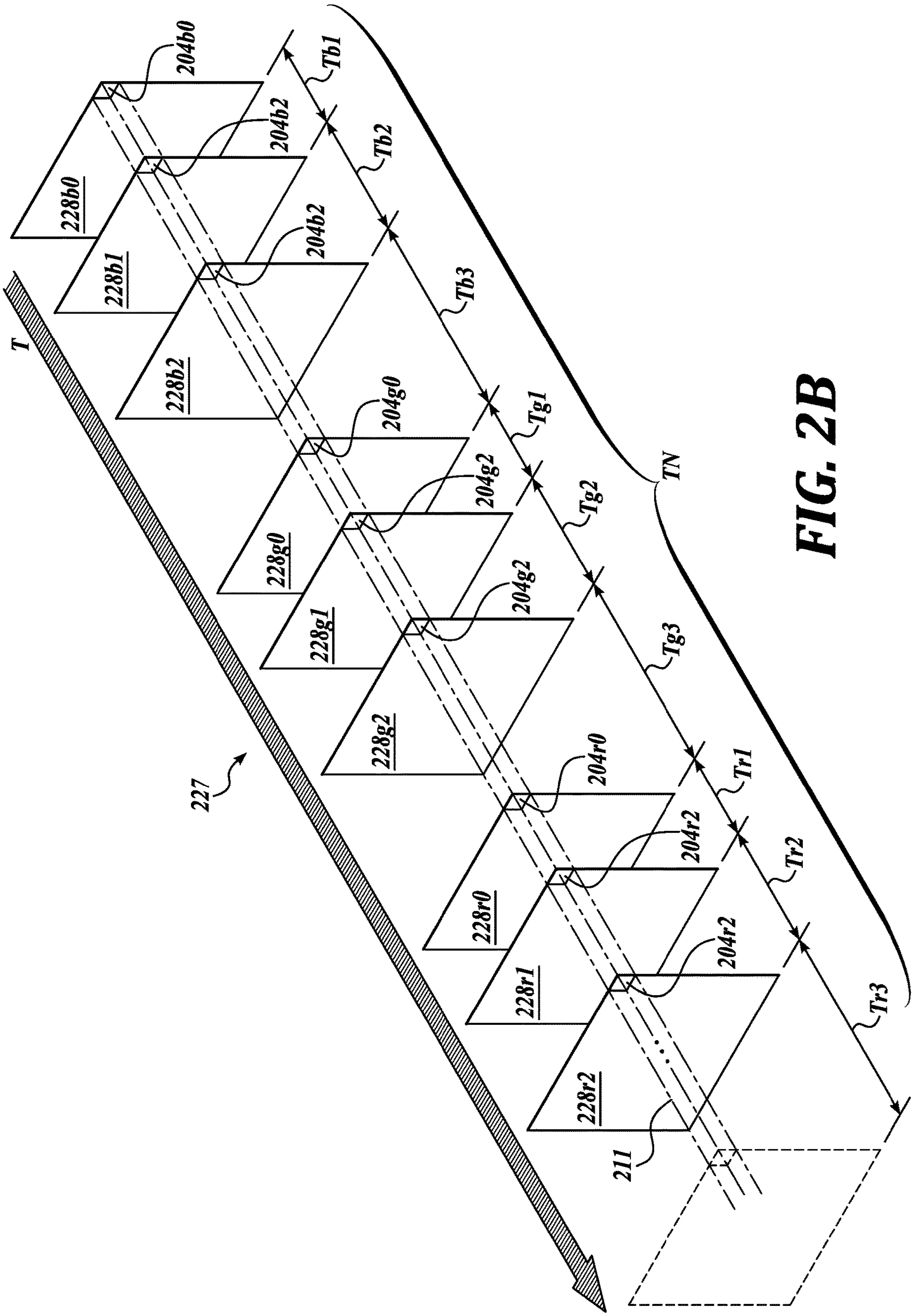
FIG. 2B is a representational diagram of bitplanes generated by a bitplane generator of the display system of FIG. 1.

FIG. 2A is a circuit diagram of a pixel 204 of a micro-LED display. The pixel 204 may include pixel circuitry including a driver 212 with a programmable current source 206 and a PWM generator 210. The pixel circuitry may also include three micro-LEDs 215A (e.g., LED_G), 215B (e.g., LED_R), 215C (e.g., LED_B). In some embodiments, the three LEDs are arranged in an array. In some embodiments, the current source 206 includes a transistor 209 and a capacitor 208. In some embodiments, the PWM generator 210 includes a pair of transistors 242 and a pair of invertors 244.

Based on the output PWM signal, the luminance of each LED 215A, 215B, 215C may be adjusted. The at least three LEDs 215A, 215B, 215C may correspond to a green LED 215A, a red LED 215B, and a blue LED 215C, respectively. Each LED of the at least three LEDs 215A, 215B, 215C may be independently controlled. In response to a voltage from the positive supply voltage VDD_LED of the programmable current source 206, each LED is turned on. VREF is a reference voltage for all pixel circuits on the panel. In particular, VREF is used to control the value of current generated by a transistor T1. Each LED outputs a color signal (EN_G[n], EN_R[n], EN_B[n]) when turned on (enabled).

FIG. 2B is a representational diagram of a bitplane 227 generated by the bitplane generator 225 of FIG. 1. In the illustrated embodiment, the bitplane 227 has 3-bit sub-color depth and includes red, green, and blue subframes of even size. A binary PWM drives 16 rows of micro-LEDs or pixel circuits on the display panel.

The illustrated embodiment is based on following assumptions: (a) the R, G, and B subframes have the same size; (b) the sub-color is 3-bit deep; (c) a binary PWM is used; and (d) the micro-LED panel includes 16 rows. Because the illustrated embodiment is based on a binary PWM and 3-bit sub-color depth, the number of bitplanes is also three. A person of ordinary skill will understand that the foregoing assumptions can be changed in different embodiments. The bitplane 227 comprises a number of sequentially generated sub-frames 228*xy*, wherein x is a letter representing a color of the sub-frame (r-red, g=green, and b=blue), and y is a 3-bit display date that corresponds to a number (0, 1, 2, etc.) representing the sequential order of the sub-frames of a particular color. Because the PWM is binary and the bitplane 227 has 3-bit sub-color depth, each color includes three subframes.

At an initial time, a first blue sub-frame **228*b*0 is generated and displayed over time interval Tb1. Successive blue sub-frames 228*b*1 and 228*b*2 are generated in series over time intervals Tb2 and Tb3, successively. For instance, time intervals Tb1, Tb2 and Tb3 may have their respective durations correspond to powers of 2 as 2 units of time being a duration of Tb1, 4 units of time being a duration of Tb2 and 8 units of time being a duration of Tb3. After the blue sub-frames have been displayed, green sub-frames 228*g*0, 228*g*1, and 228*g*2 are generated over successive time intervals Tg1, Tg2, and Tg3, respectively. Display of the green sub-frames is followed by red sub-frames 228*r*0, 228*r*1, and 228*r*2** being displayed successively over time intervals Tr1, Tr2, and Tr3, respectively.

Figure 2C:
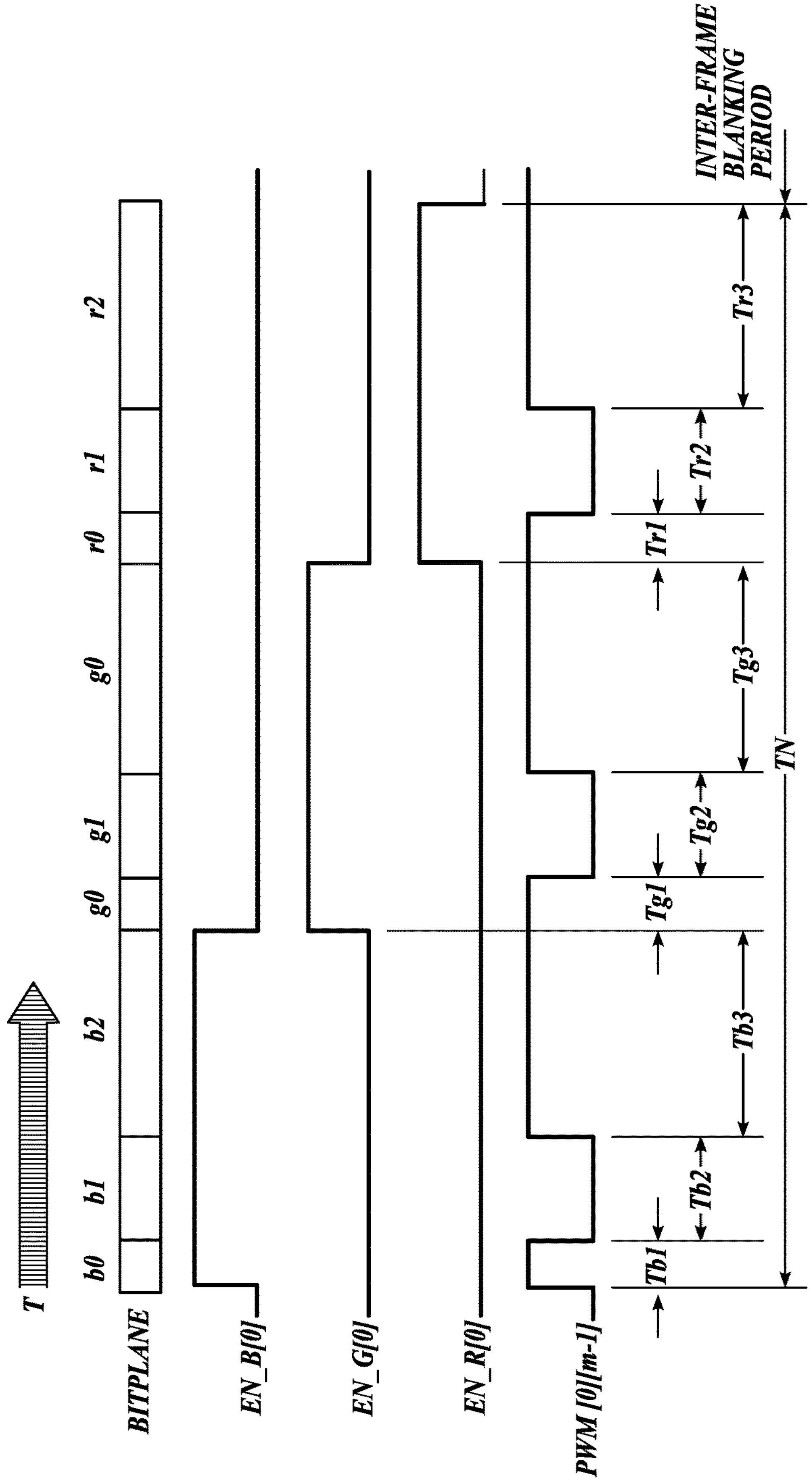
FIG. 2C is another representation of the output of the bitplane generator of FIG. 1.

FIG. 2C is an example of a PWM signal of a pixel circuit located at coordinate [0][m−1], where the pixel coordinate [n][m] corresponds to a pixel circuit on a micro-LED having rows having a range of 0 to N−1 and columns having a range of 0 to M−1. In the illustrated embodiment, the display data of blue is 3'b0101, the display data of green is 3'b101, and the display data of red is 3'b101.

The LED color signals (EN_B, EN_G, EN_R) are binary signals that indicate whether the corresponding LED is enabled or disabled. In the illustrated embodiment, the blue, green, and red LEDs are enabled in sequence to generate corresponding color values blue (b0, b1, b2), green (g0, g1, g2), and red (r0, r1, r2) for the corresponding subframes. Binary PWM data is written into the corresponding driver of the LED. In the illustrated example, the first bit b0 receives an ON or "1" signal, while the second bit b1 receives an OFF or "0" signal, after which the third bit b2 receives an ON or "1" signal. Similar PWM data is subsequently written for the green and red LED subframes. In this manner, the color of each pixel of the pixel array may be adjusted for each bit in a frame. Other distributions of PWM data are possible in different examples.

Figure 2D:
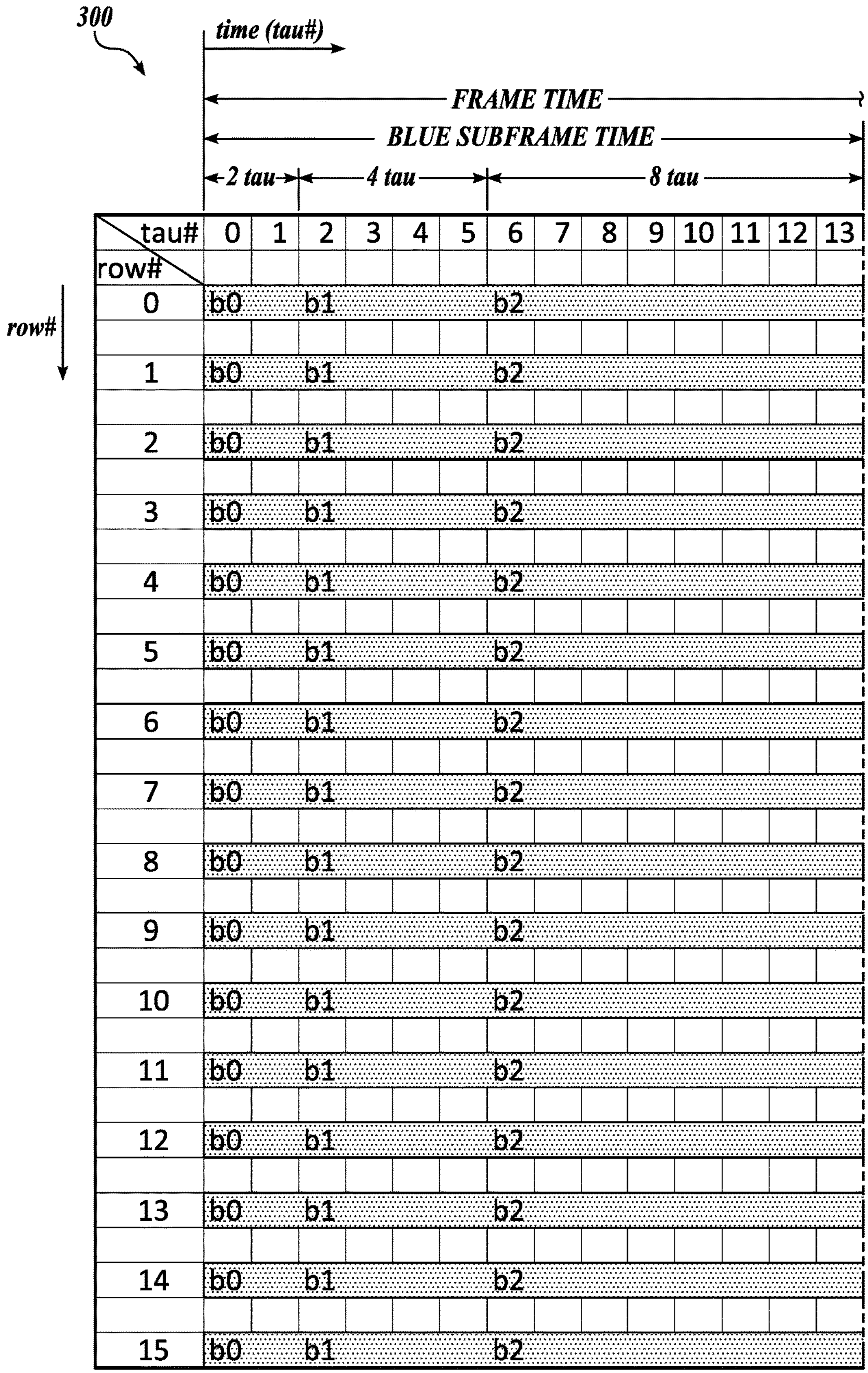
FIG. 2D is a graph of a traditional color updating schedule of the bitplane generator of FIG. 1.
Figure 2D:
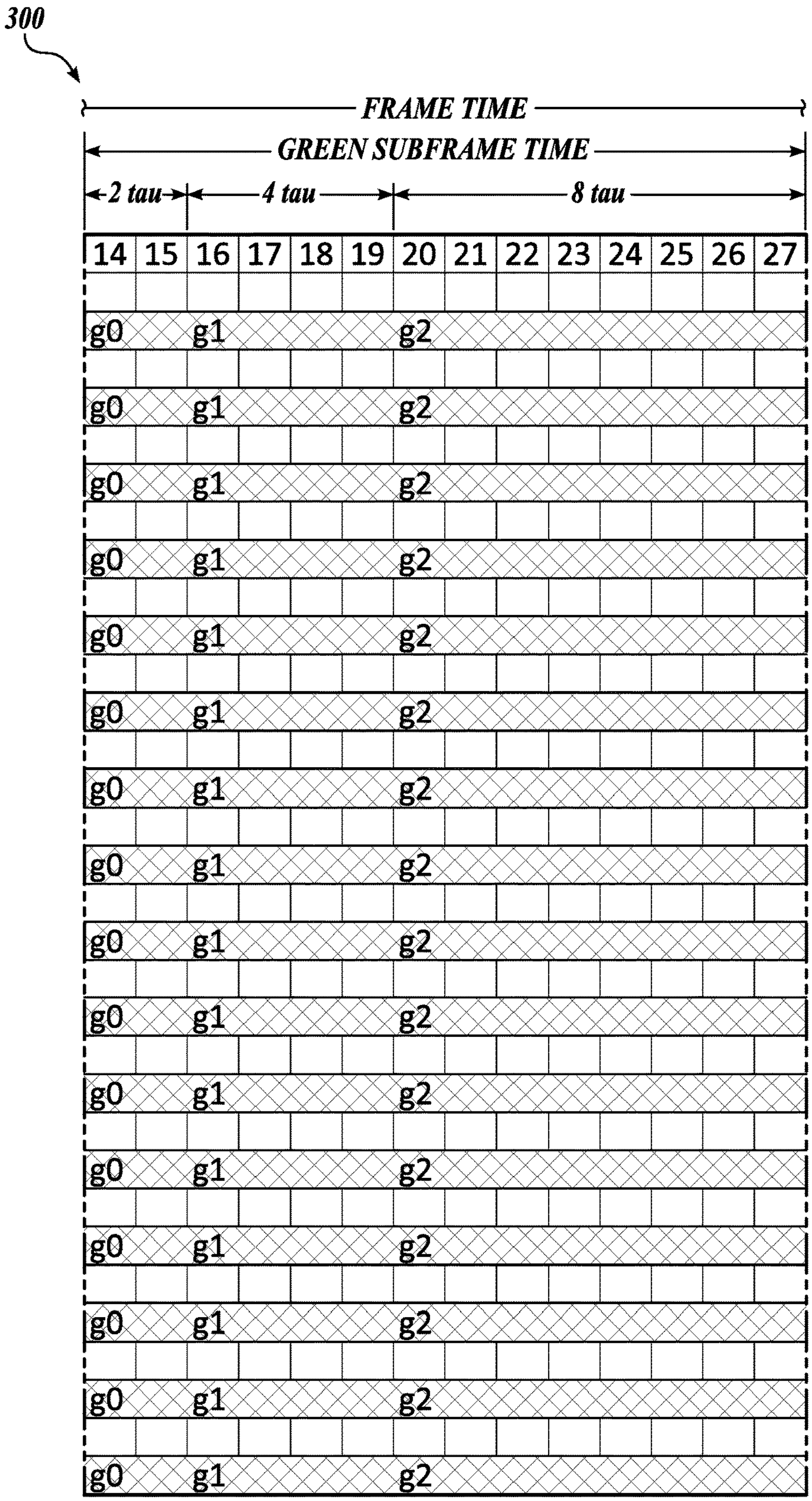
Figure 2D:
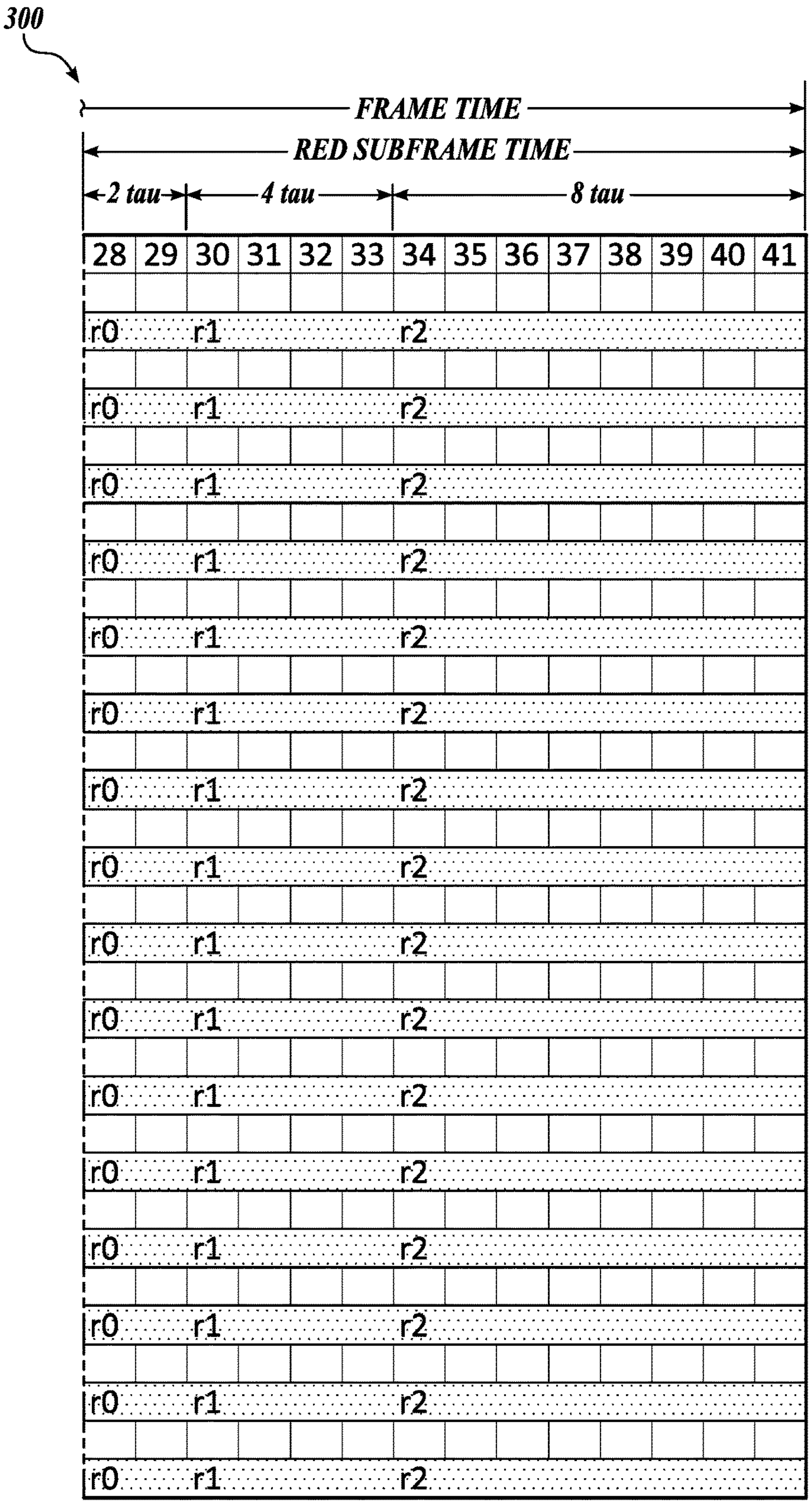

FIG. 2D is a chart of a traditional color updating schedule 300 for a micro-LED display 200 according to the bitplane generator 225 of FIG. 1. The illustrated schedule 300 is for a display having 16 rows of pixels on the display, but it will be understood that the micro-LED display may have any other suitable numbers of rows of pixels. The overall frame time is divided into red, green, and blue sub-frames of equal size. Each subframe has 3-bit color depth and a subframe time divided into 14 equal segments of a duration tau (2 tau+4 tau+8 tau). For each row, the binary PWM signal controls the timing in which the 3-bit color values are written into the driver at the first, third, and seventh segment of the subframe of the corresponding color. For example, in the blue subframe, the blue color values (b0, b1, b2) are written to the driver at times tau #0, tau #2, and tau #6, respectively. These blue color values b0, b1, b2 may be 0 or 1. During the remaining times, i.e., the times indicated in FIG. 2D with blank boxes, the updating schedule is idle, that is the value of the PWM signal does not change. Similar analysis applies to the binary PWM signal for the green and red subframes.

Figure 2E:
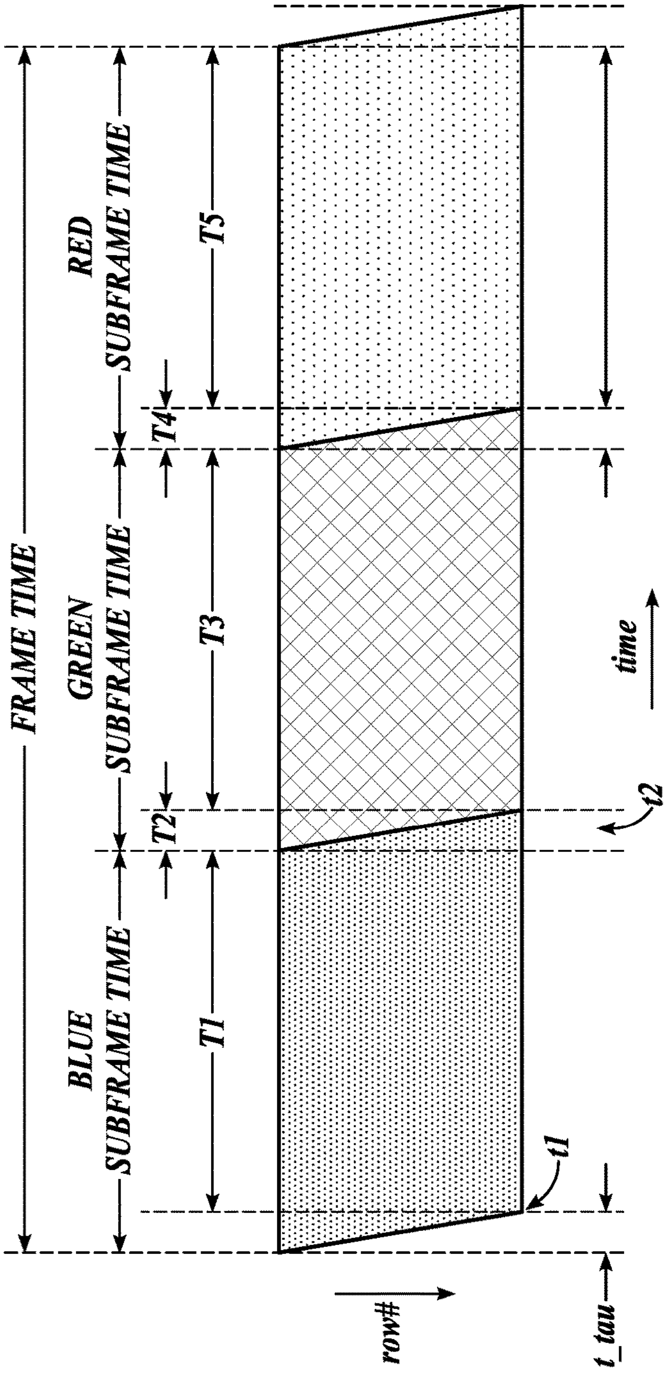
FIG. 2E shows the color updating schedule of FIG. 2D driving the display system of FIG. 1.

FIG. 2E shows the color updating of a micro-LED display when updated according to the color updating schedule shown in FIG. 2D. Different hatching indicates different color of the micro-LEDs. The time t_tau is the period to update the color of all of the rows once. That is, the rows are updated sequentially, and as a result, an amount of time t_tau passes between the updating of the first row and the updating of the last row.

Still referring to FIG. 2E, the first row (designated row #0 in FIG. 2D) is updated at the start of the frame time. All of the subsequent rows are updated during the initial time t_tau of the frame time. The delay t_tau between updating the first row and updating the last row continues throughout each subframe time and throughout the overall frame time of the update. After the initial t_tau time delay, all rows continue to be updated with the first subframe color through time T1. At the beginning of time T2, the first row begins updating with the second subframe color, and each of the remaining rows continue to update with the first subframe color until the first subframe is complete. As each row completes the first subframe color updating, the row begins the second subframe color updating. As a result, during time T2, some of the rows are updating the second subframe, and the remaining rows are completing the first subframe updating.

During time T3, all rows are updating the second subframe. During time T4, some rows have finished updating the second subframe and have started updating the third subframe, while the remaining rows finish updating the second subframe. During time T5, all rows are updating the third subframe. Time T5 ends when the first row finishes updating the third subframe, after which the remaining rows sequentially finish updating the third subframe. As the remaining rows finish updating the third subframe, the rows that have already completed the subframe updating remain idle until the next update sequence begins.

Figure 2F:
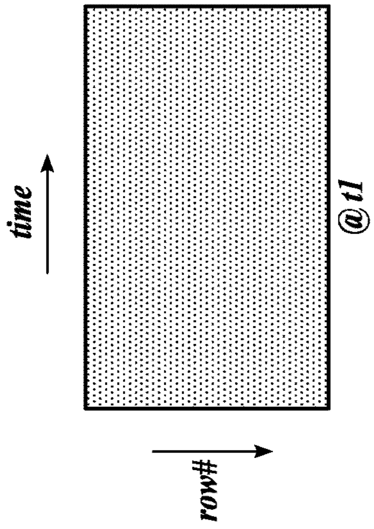
FIG. 2F shows the colors displayed on the display at a time t1 according to the color updating system of FIG. 2D.
Figure 2G:
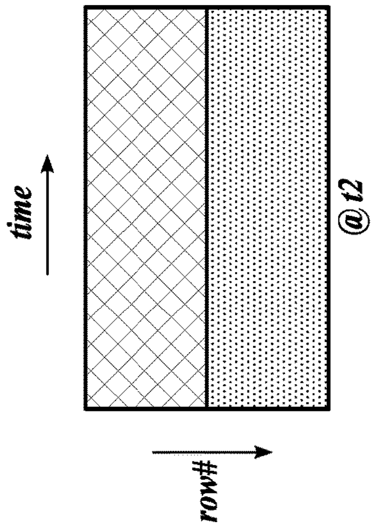
FIG. 2G shows the colors displayed on the display at a time t2 according to the color updating system of FIG. 2D.

During most of the frame time, i.e., T1, T3, and T5, all rows are displaying the same subframe color. For example, as shown in FIG. 2F, all rows display the first subframe color at time t1. Referring to FIG. 2G, at time t2, the upper portion of the screen displays the second subframe color, and the bottom portion of the screen displays the first subframe color.

Traditional color updating schedules continuously alternate between displaying one subframe color and displaying two subframe colors. Referring again to FIG. 2E, the color updating schedule causes the display to alternative between displaying one subframe color (during times T1, T3, and T5) and two subframe colors (during times T2, and T4). The continuous switching between one and two subframe colors being displayed in conjunction with the lag between the first row being updated and the last row being updated results in CBU.

FIGS. 3A through 3E show an embodiment of a color updating schedule that eliminates CBU. As will be explained in further detail, the color updating schedule includes "row-shift" and "frame-rotate" to minimize and/or eliminate detectable CBU.

Figure 3A:
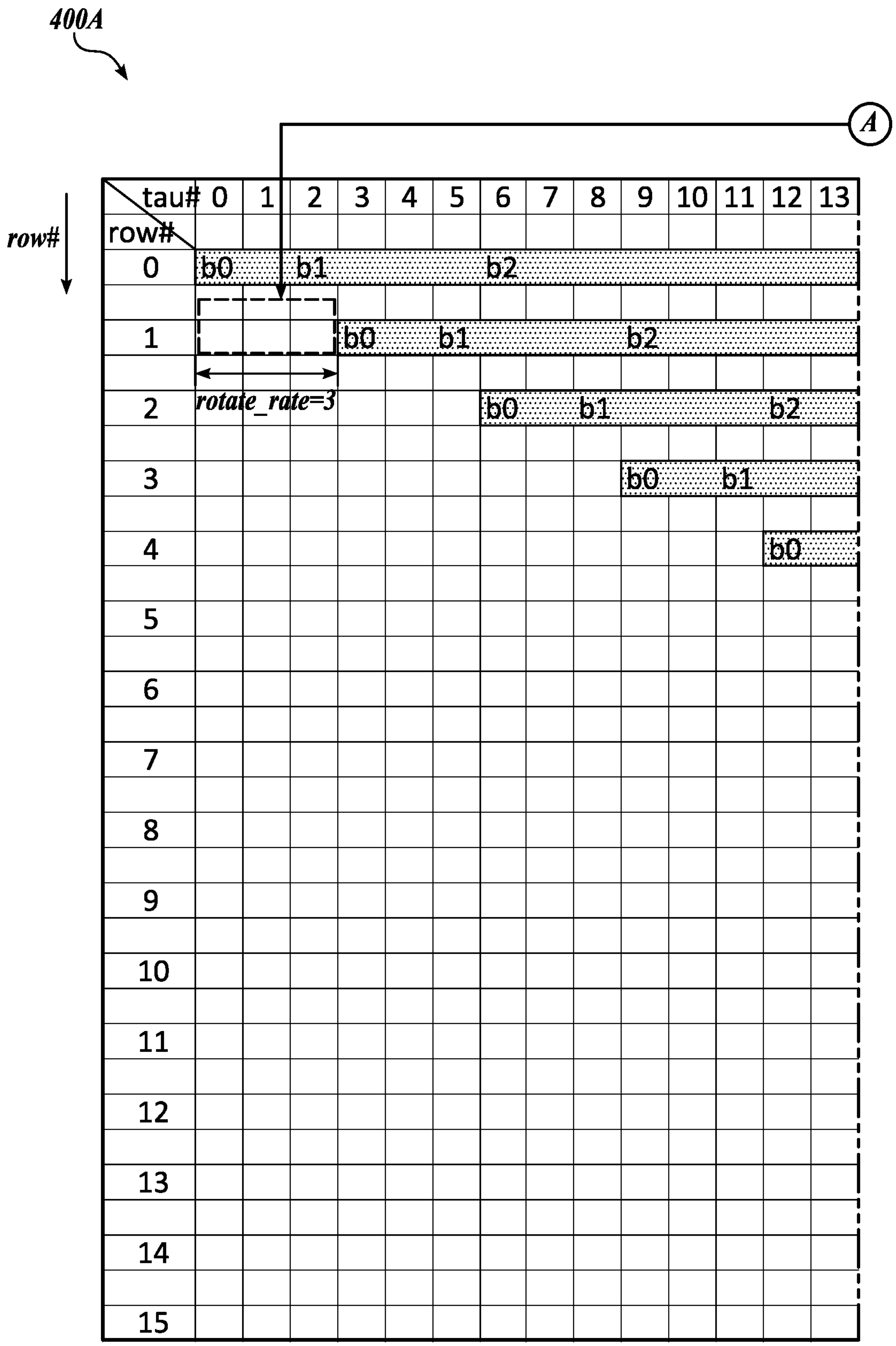
FIG. 3A is an example of a color updating schedule of the display system of FIG. 1, where the color updating schedule implements row-shifting according to an embodiment of the disclosed subject matter.
Figure 3A:
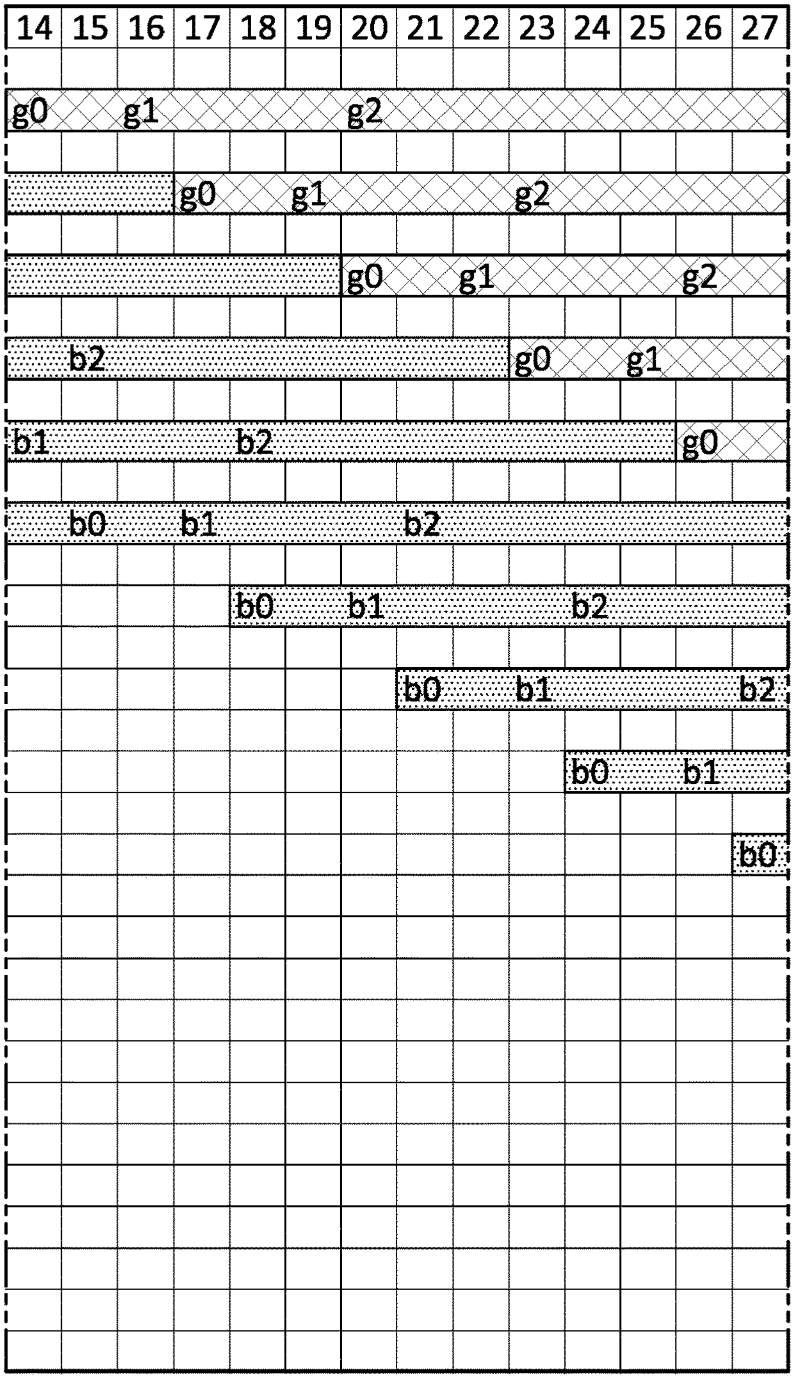
Figure 3A:
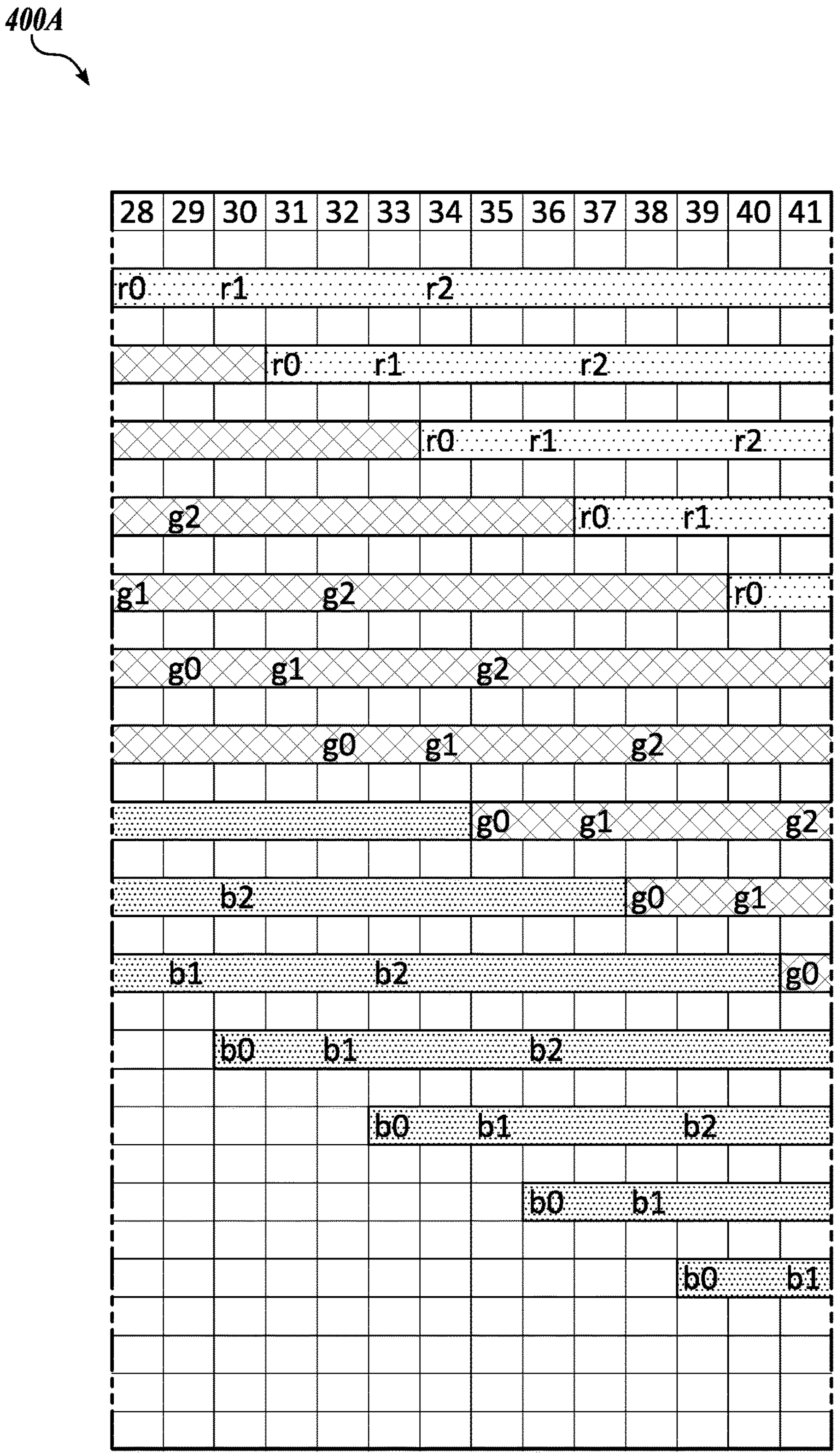
Figure 3A:
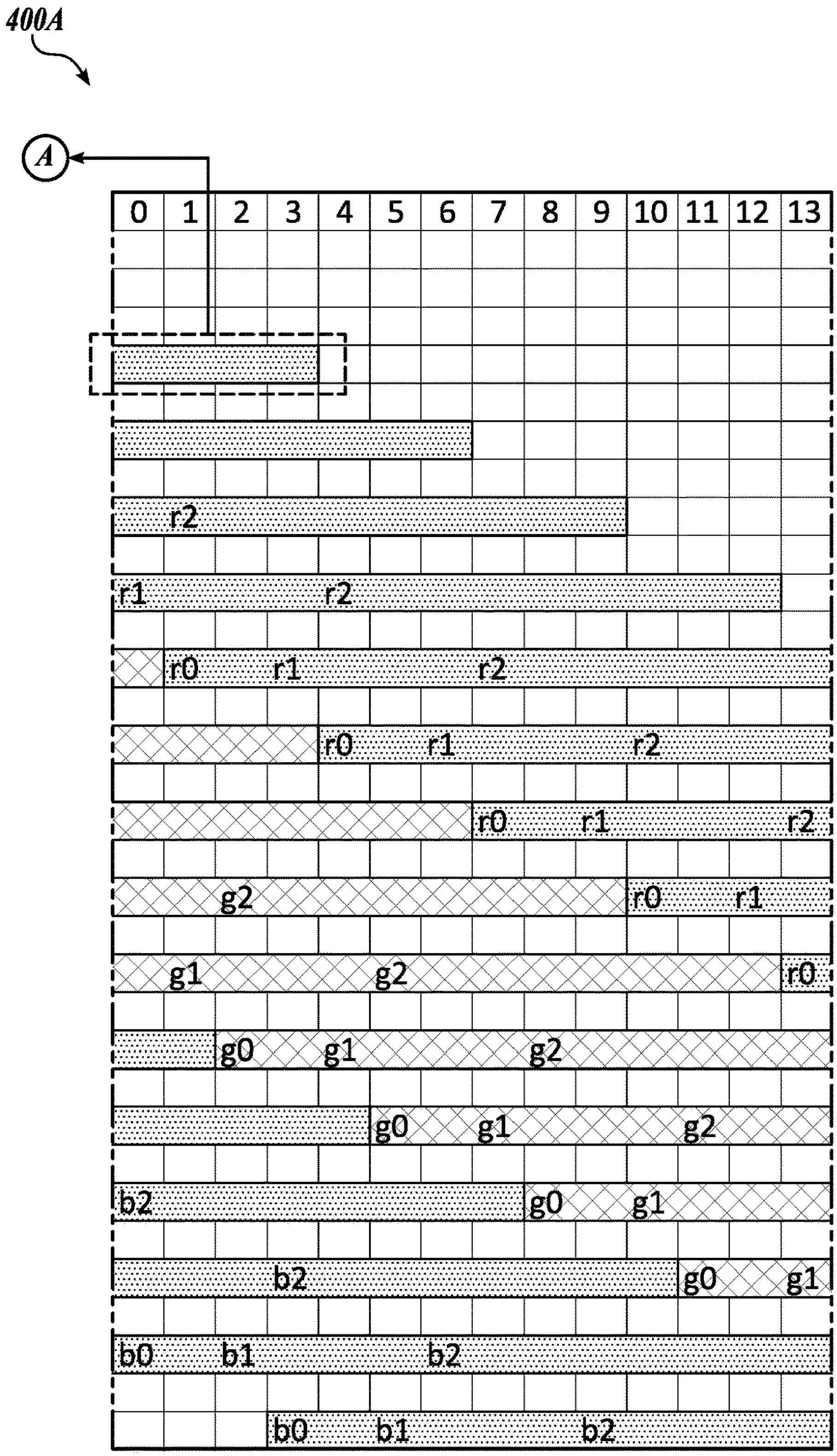
Figure 3A:
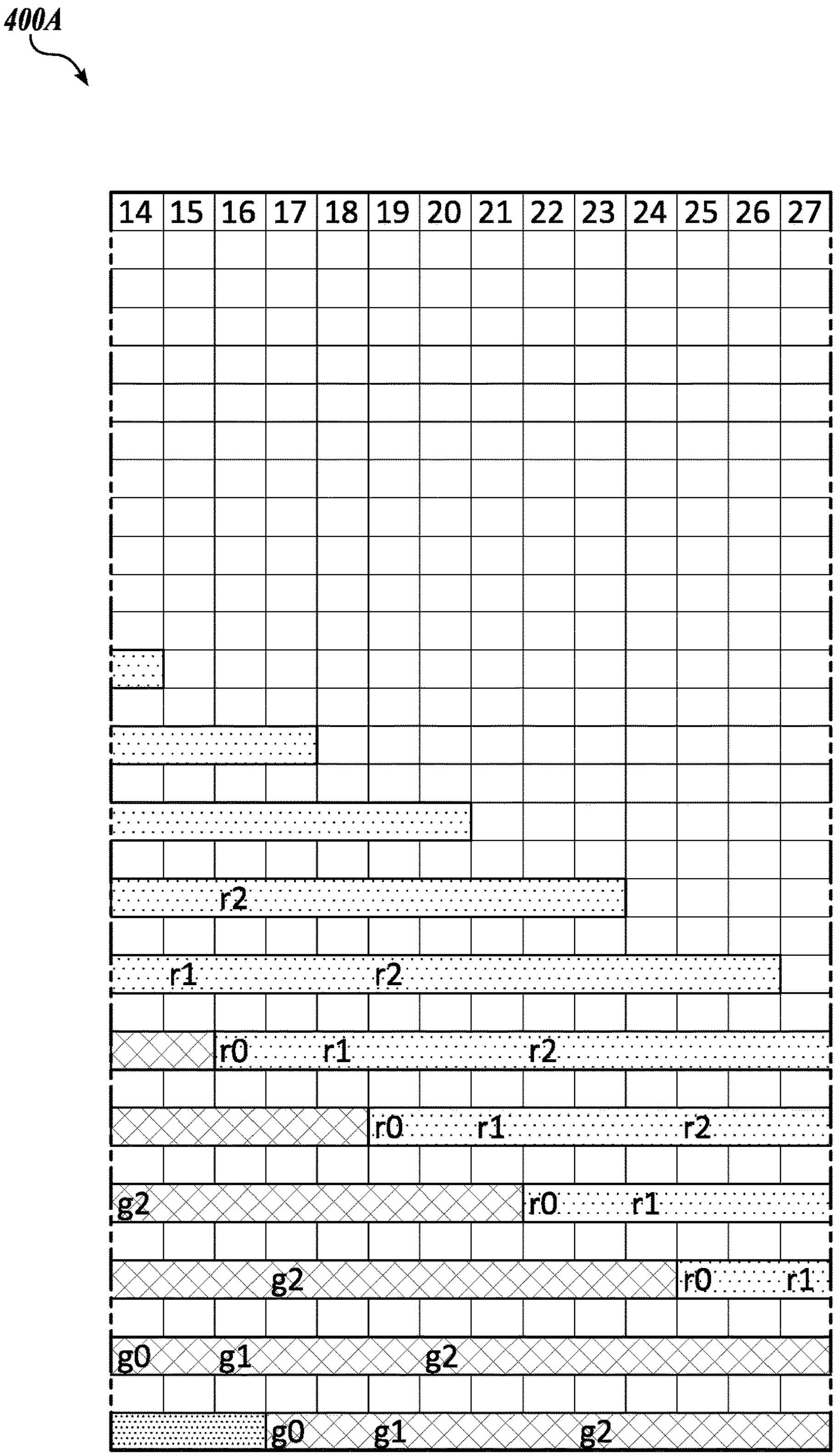
Figure 3A:
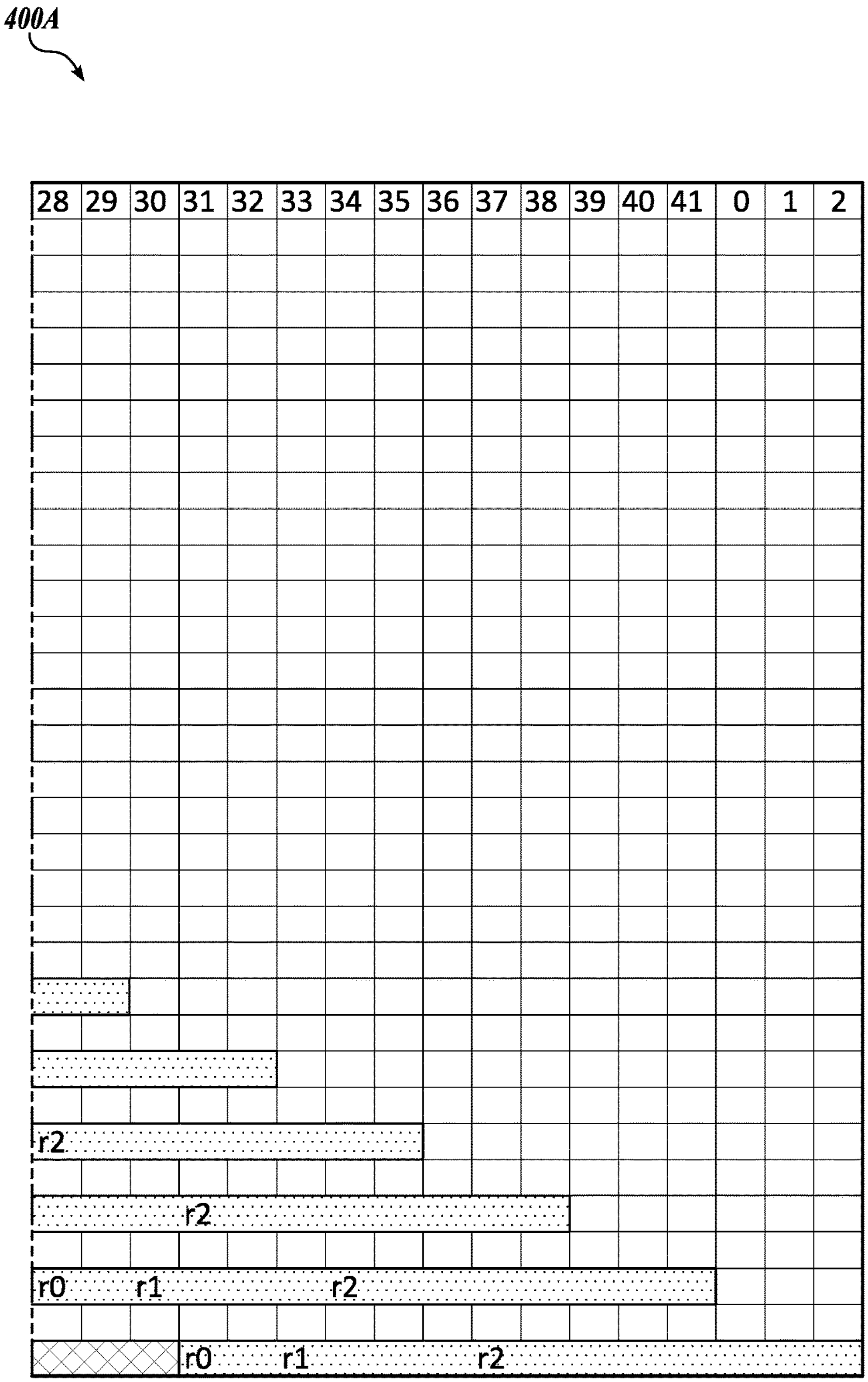

Referring to FIG. 3A, a chart of an embodiment of a color updating schedule 400A for a micro-LED display according to aspects of the present disclosure is shown. The color updating schedule 400A is similar to the color updating schedule 300 shown in FIG. 2D but includes "row-shift." For the first row (row #0), the PWM data of b0 is written into the corresponding driver of the LED at time tau #0. For the second row (row #1), the PWM data of b0 is written into the corresponding driver of the LED at time tau #3. That is, the writing of the PWM data of b0 (and also of b1 and b2) for the second row is delayed relative to the writing of the PWM data of b0 for the first row. In the illustrated embodiment, the delay is 3 tau, i.e., 3 blocks or 3 time units in the chart of FIG. 3A. It will be appreciated that the delay can be greater or less than the illustrated 3 blocks. As a consequence of the delay of 3 tau to apply PWM values to one row of micro-LEDs, the writing of the PWM data of b0 into the corresponding driver of the LED for a subsequent row is delayed relative to the writing of the PWM data of b0 for the previous row. These delays accumulate from one row of micro-LEDs to the next one.

Figure 3B:
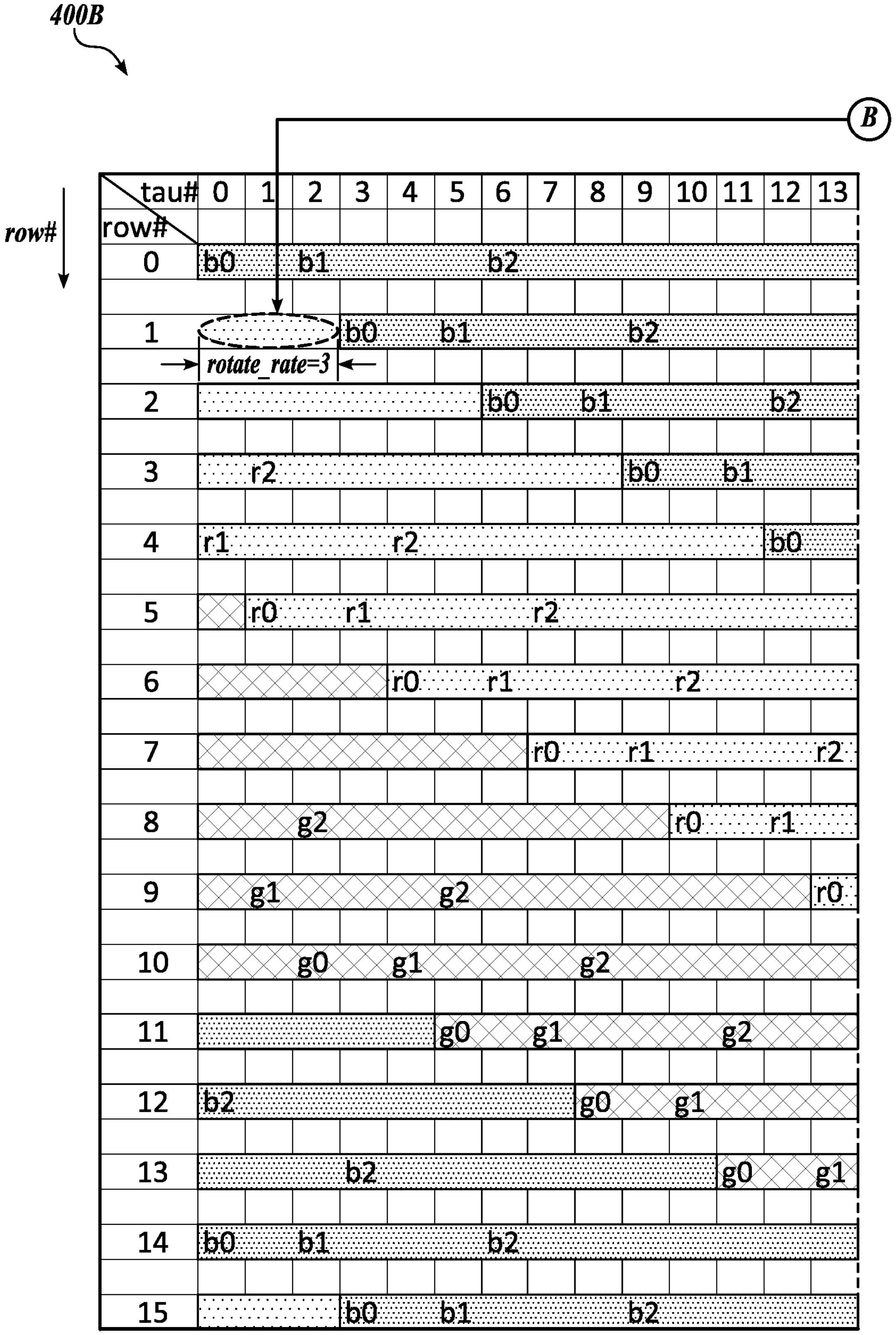
FIG. 3B is another example of a color updating schedule similar to the color updating schedule of FIG. 3A, where the color updating schedule further implements frame-rotation according to another embodiment of the disclosed subject matter.
Figure 3B:
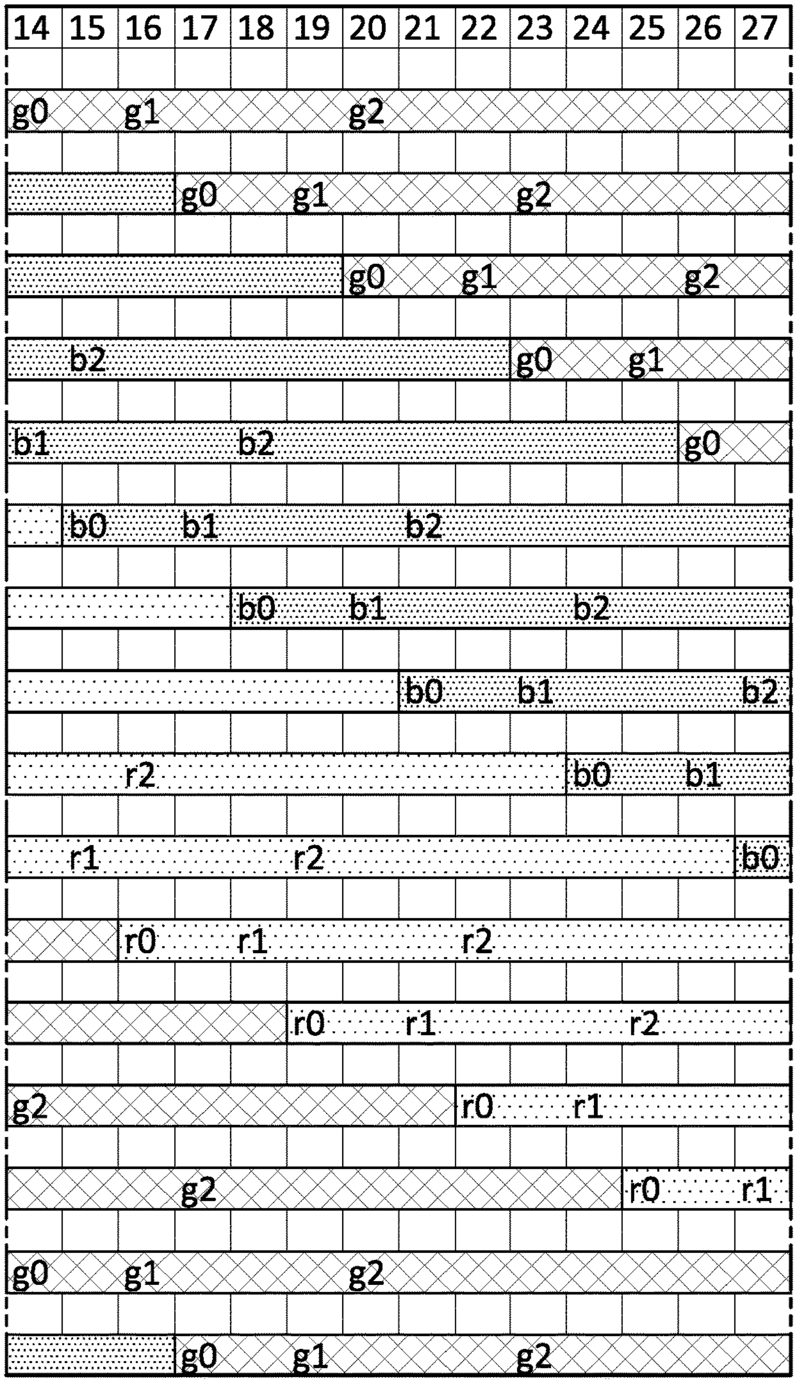
Figure 3B:
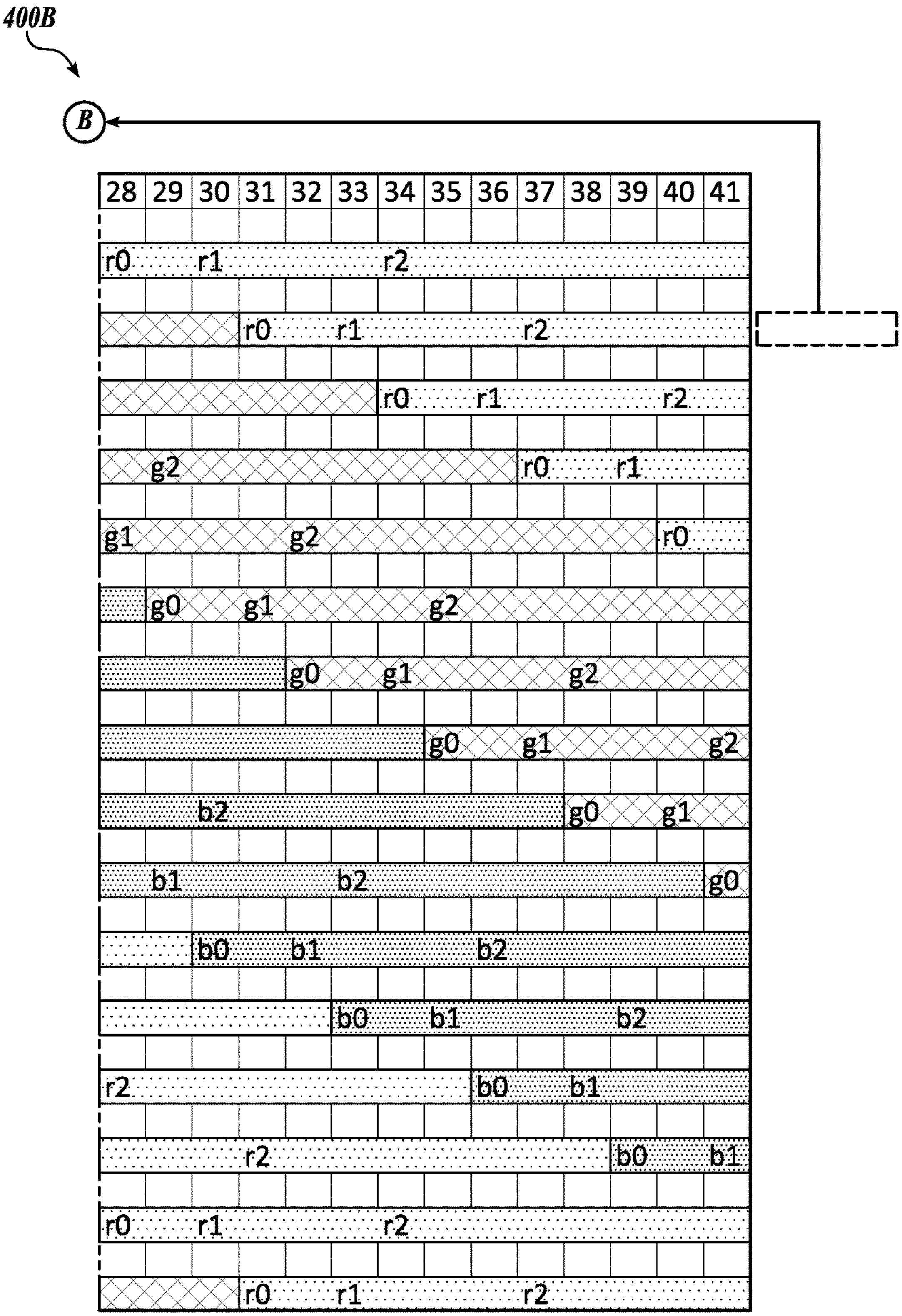

FIG. 3B shows a chart of an embodiment of a color updating schedule 400B for a micro-LED display according to aspects of the present disclosure. Color updating schedule 400B is similar to color updating schedule 400A except that color updating schedule 400B also includes frame-rotate. As previously described, row-shift delays the writing of the PWM data of b0 (and also of b1 and b2) for a given row relative to the previous row. For each row, frame-rotate rotates PWM data from the end of the frame time (corresponding to a different color of LED, in the illustrated case a red LED) back to tau #0 to fill the otherwise idle time before the writing of the PWM data of b0 into the corresponding driver of the LED with PWM. For example, in the second row (row #1), the PWM data of b0 is written into the corresponding driver of the LED at time tau #3. Frame-rotate fills tau #0-2 with portion of the red subframe PWM data that would otherwise be a part of the next frame.

Figure 3C:
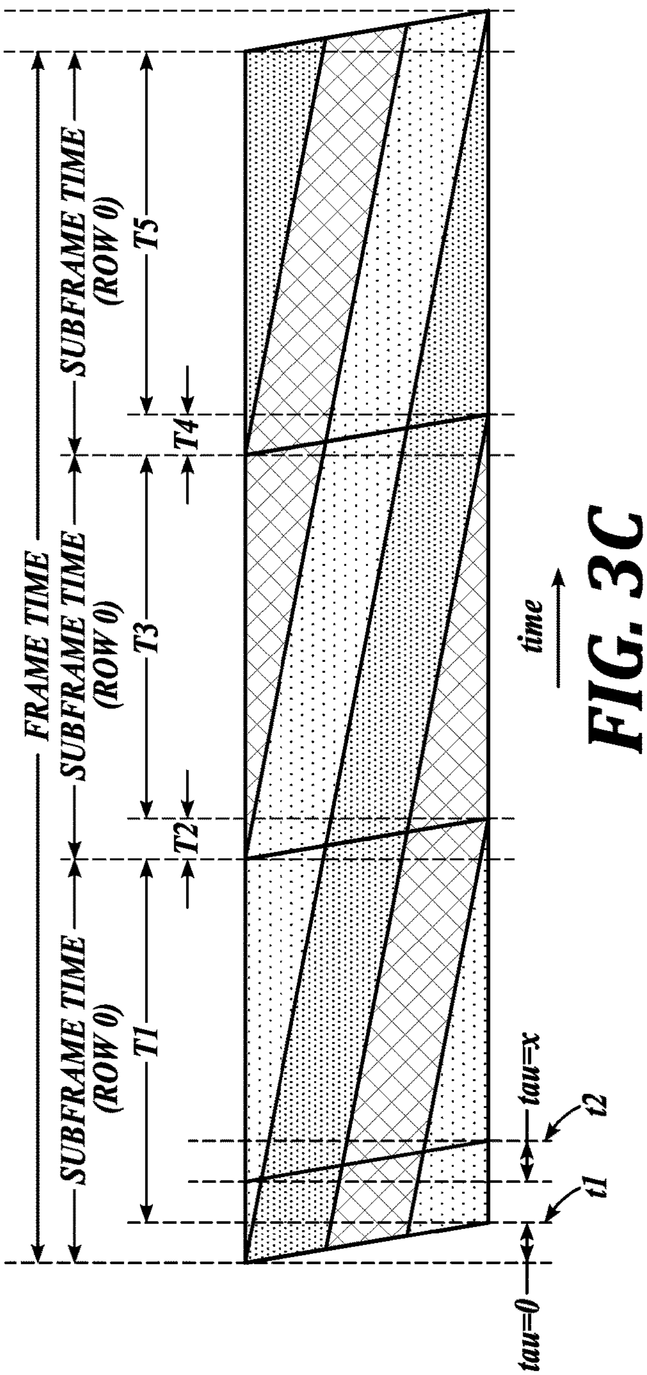
FIG. 3C shows the color updating schedule of FIG. 3B driving the display system of FIG. 1.

FIG. 3C shows the actual updating of a micro-LED display when updated according to the color updating schedule 400B shown in FIG. 3B. As before, different hatching indicates different color of the micro-LED (e.g., red, blue, green). For each row, the frame-shift delays the initial writing of the PWM data of b0 into the corresponding driver of the LED relative to the previous row. The frame-rotate process moves PWM data writing that would otherwise occur after the frame time to the beginning of the frame time so that the entire frame (e.g., micro-LED values for the entire display panel) is written during the frame time.

Figure 3D:
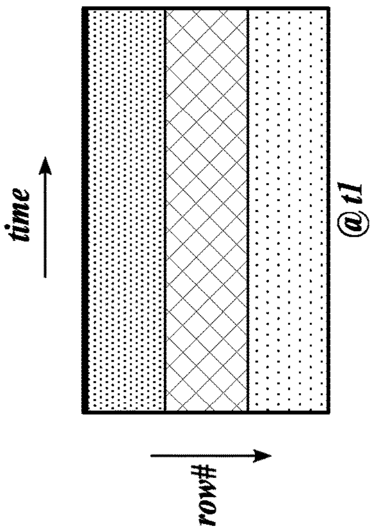
FIG. 3D shows the colors displayed on the display at a time t1 according to the color updating system of FIG. 3B.
Figure 3E:
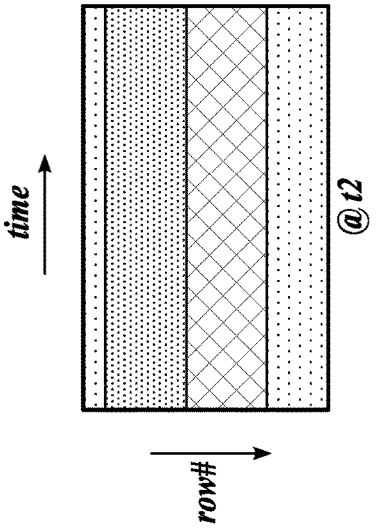
FIG. 3E shows the colors displayed on the display at a time t2 according to the color updating system of FIG. 3B.

As a result of the frame-shift and frame-rotate, the display panel displays more than one color at any given instant. For example, FIGS. 3D and 3E show the display panel colors at times t1 and t2, respectively, as indicated in FIG. 3C. In the illustrated embodiment, all three subframe colors are displayed on at least some of the rows and any instant during the frame time. As a result, the CBU that results from the color updating schedule 400A of FIG. 3A is avoided or at least reduced.

Figure 4A:
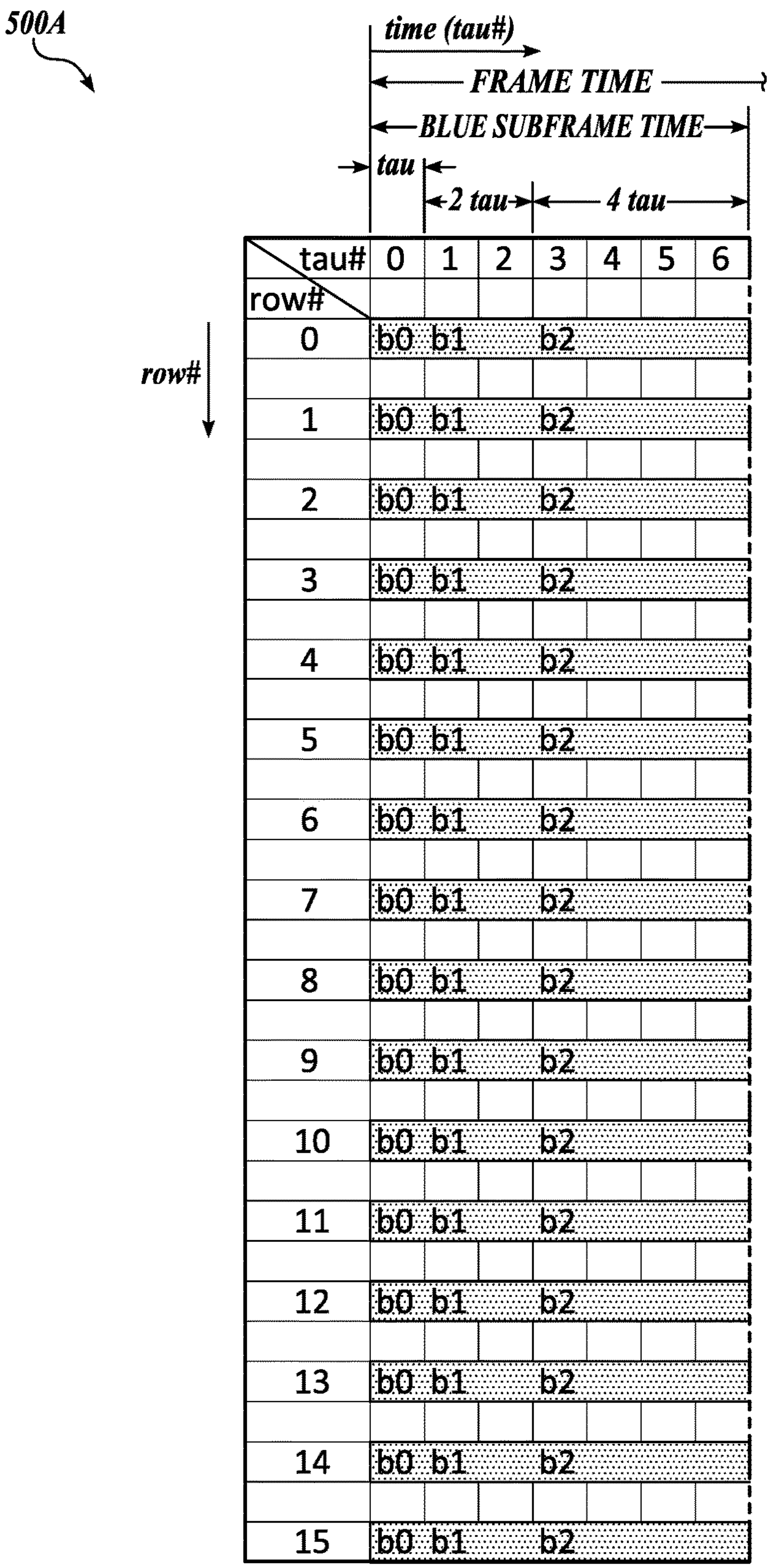
FIG. 4A is another example of a color updating schedule of the display system of FIG. 1, where the color updating schedule implements row-shifting according to another embodiment of the disclosed subject matter.
Figure 4A:
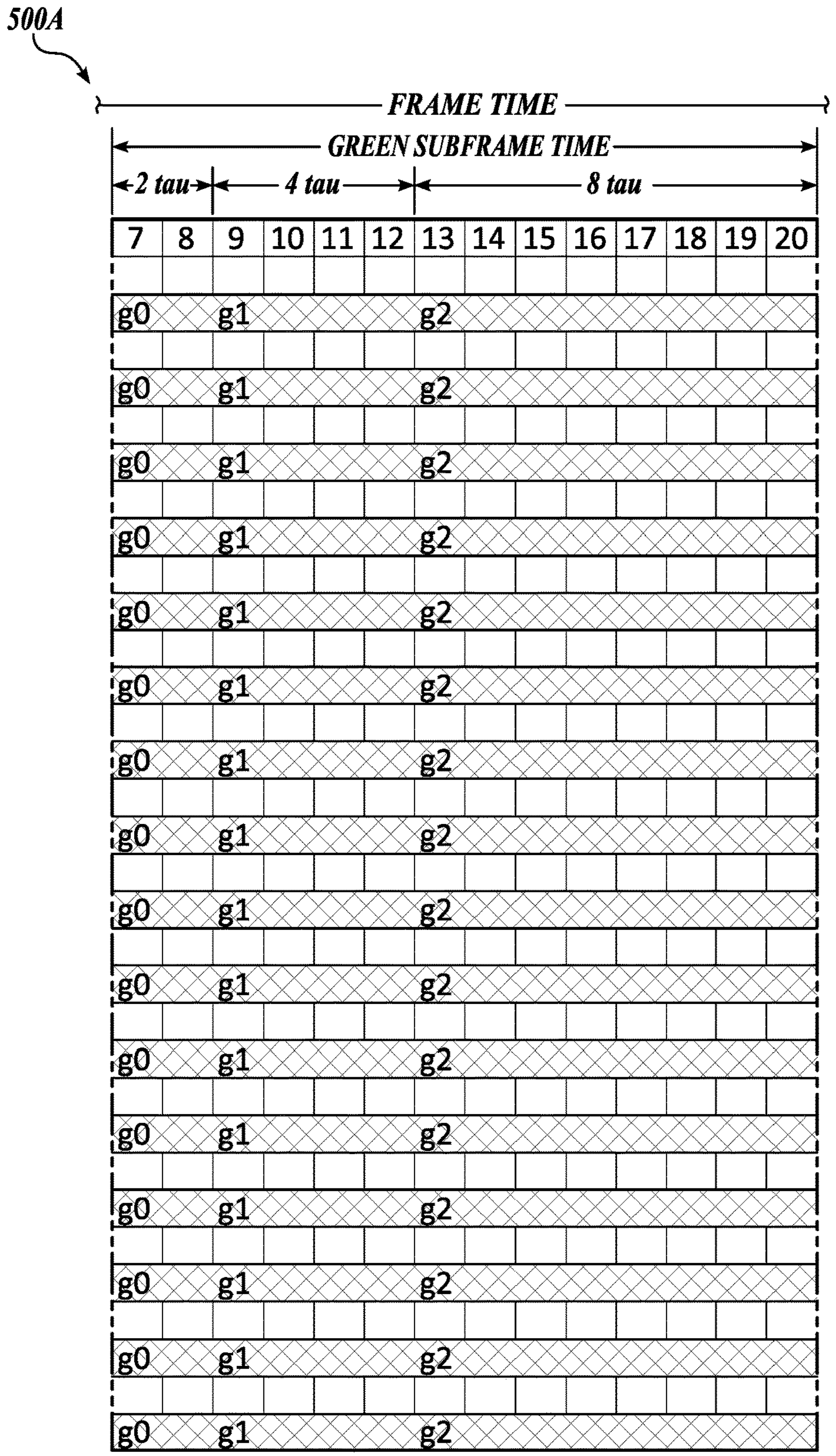
Figure 4A:
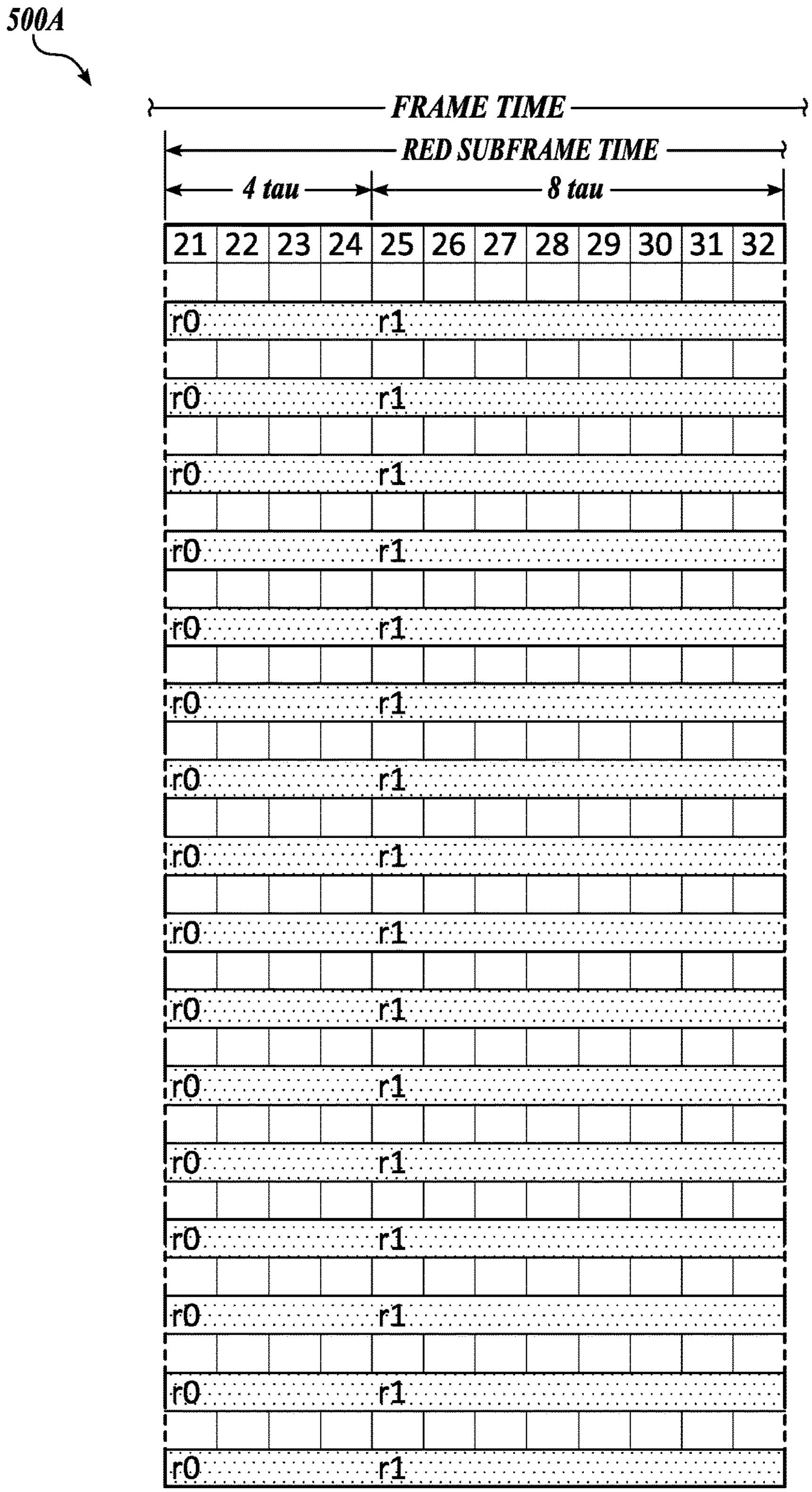
Figure 4A:
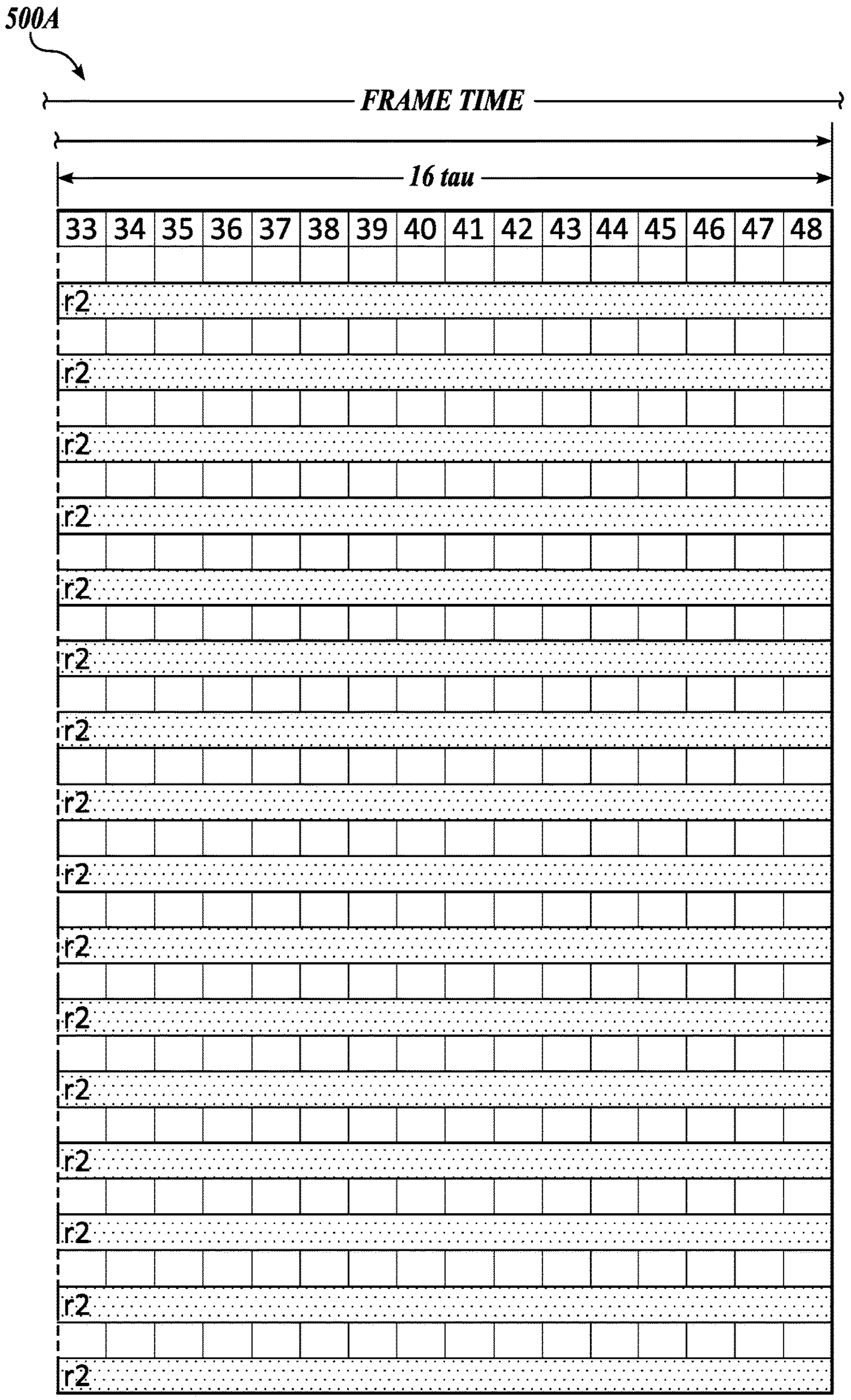

FIG. 4A is a chart of another embodiment of a color updating schedule 500A for a micro-LED display according to aspects of the present disclosure. The luminous efficiency of an LED, i.e., how well the LED produces visible light, is known to vary according to the color of the LED. In order to account for the different LED efficiencies, the color updating schedule can vary the subframe size of the different colors so that more efficient LEDs have shorter sub-frame times, and less efficient LEDs have longer sub-frame times.

The color updating schedule 500A shown in FIG. 4A is similar to the color updating schedule 400A shown in FIG. 3A except that the subframe times for the red, green, and blue subframes are different. In some embodiments, the length of each subframe time is inversely proportional to the luminous efficiency of the corresponding LED. In some embodiments, the lengths of two subframe times are equal to each other and different from the length of the subframe time for a third LED. In some embodiments, the subframe time of each LED is any suitable length and may be the same or different than the subframe time of any of the other LEDs. In the illustrated embodiments, the total blue subframe time is 7 tau (blue subframes of 1 tau, 2 tau, and 4 tau), the total green subframe time is 14 tau (green subframes of 2 tau, 4 tau, and 8 tau), and the total red subframe time is 28 tau (red subframes of 4 tau, 8 tau, and 16 tau).

Figure 4B:
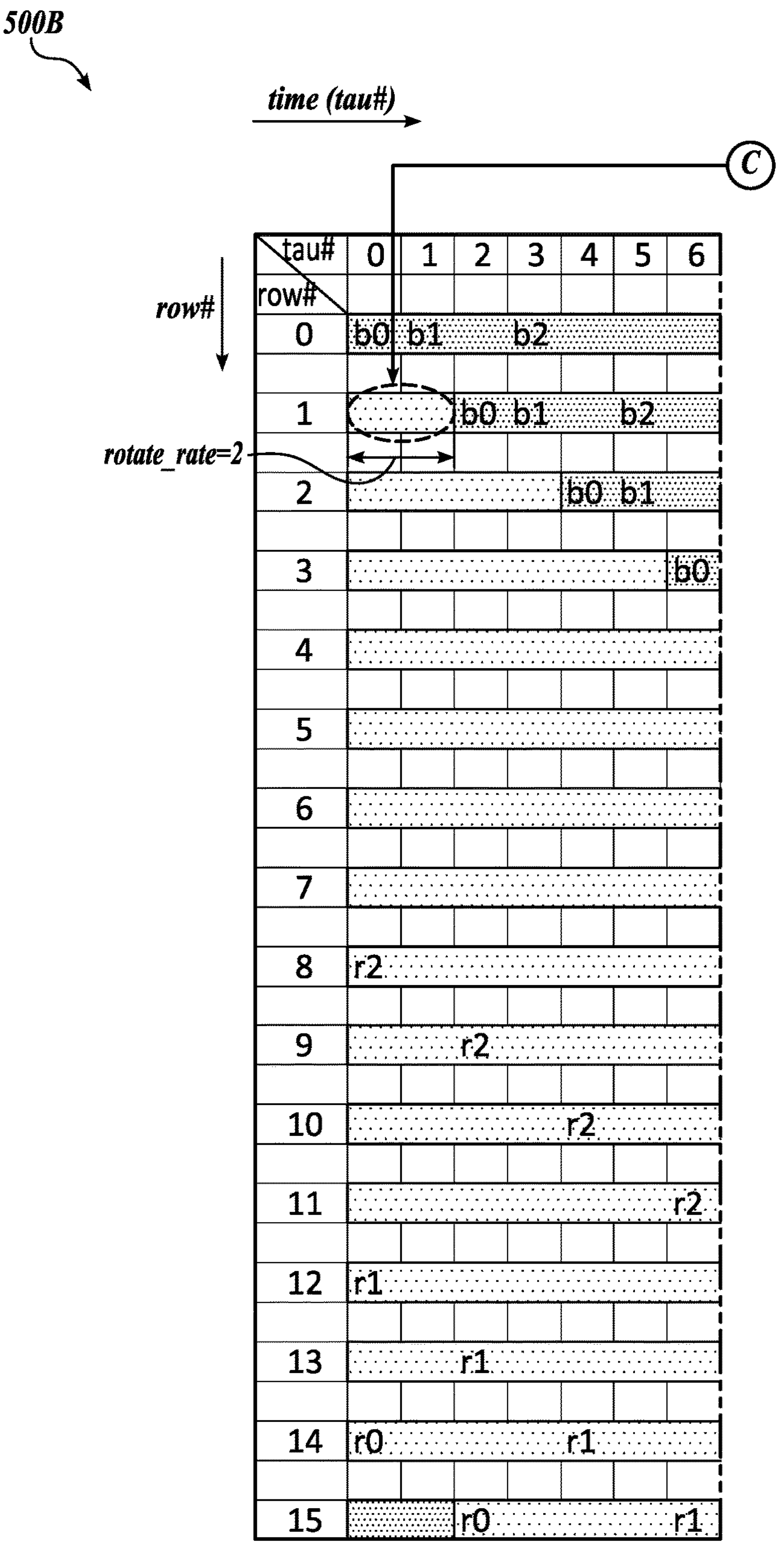
FIG. 4B is another example of a color updating schedule similar to the color updating schedule of FIG. 4A, where the color updating schedule further implements frame-rotation according to another embodiment of the disclosed subject matter.
Figure 4B:
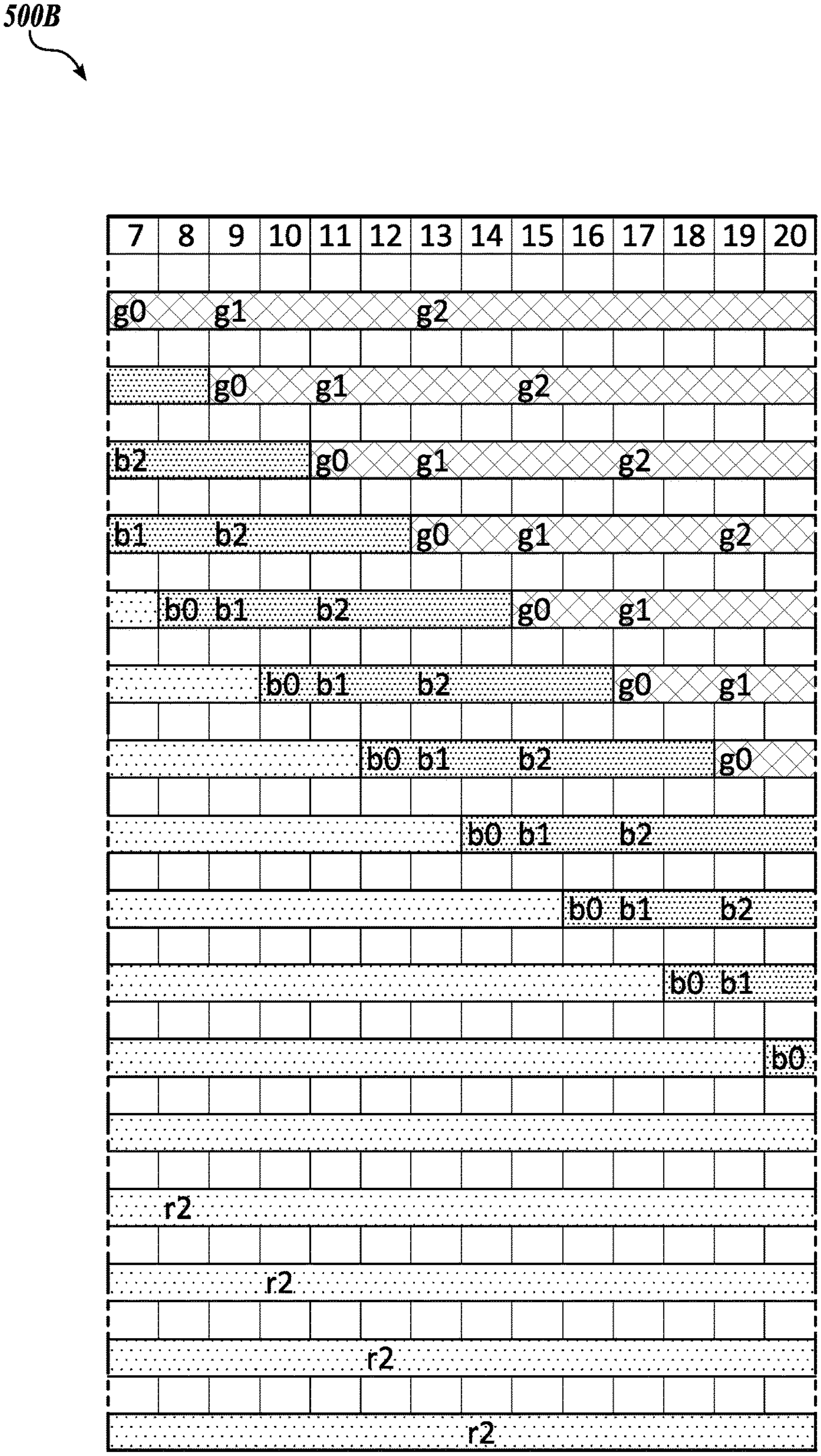
Figure 4B:
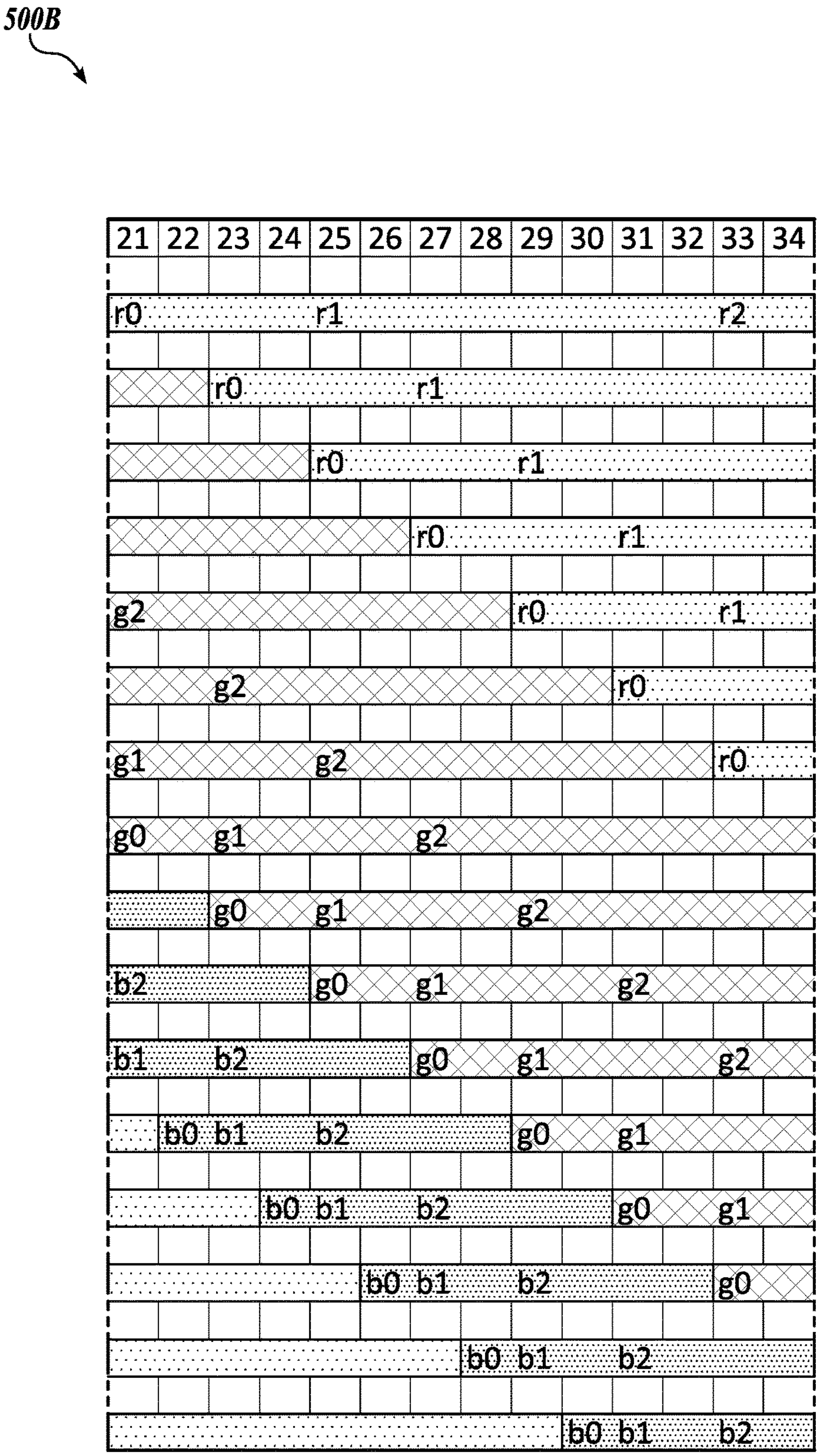
Figure 4B:
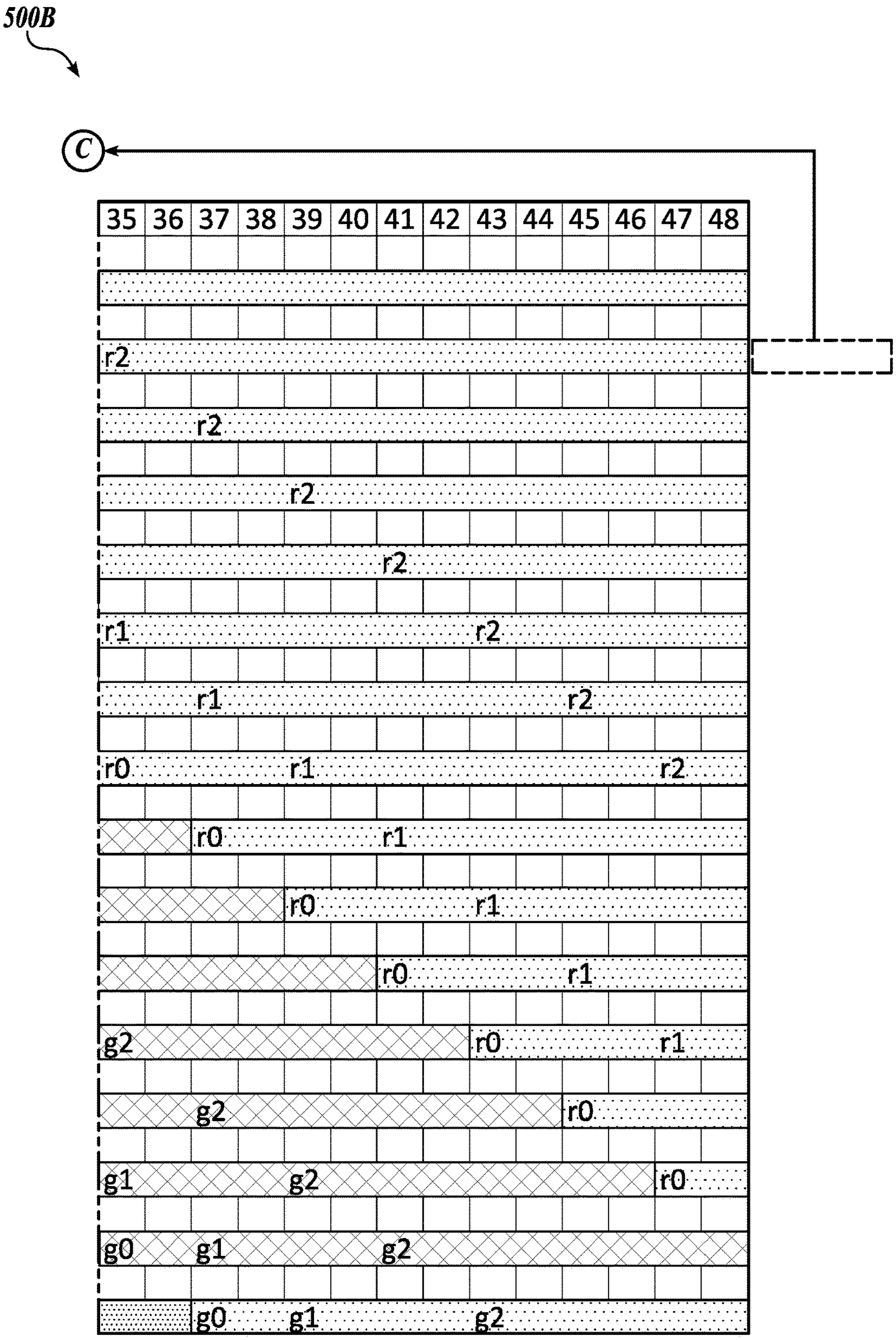

FIG. 4B shows a chart of an embodiment of a color updating schedule 500B for a micro-LED display according to aspects of the present disclosure. Color updating schedule 500B is similar to color updating schedule 500A except that color updating schedule 500B also includes frame-rotate. Color updating schedule 500B is also similar to color updating schedule 400B shown in FIG. 3B except that color updating schedule 500B also includes subframe times of different lengths. In particular, in the illustrated embodiments, the blue subframe time is X tau long, the green subframe time is time is Y tau long, and the red subframe is Z tau long.

Figure 5A:
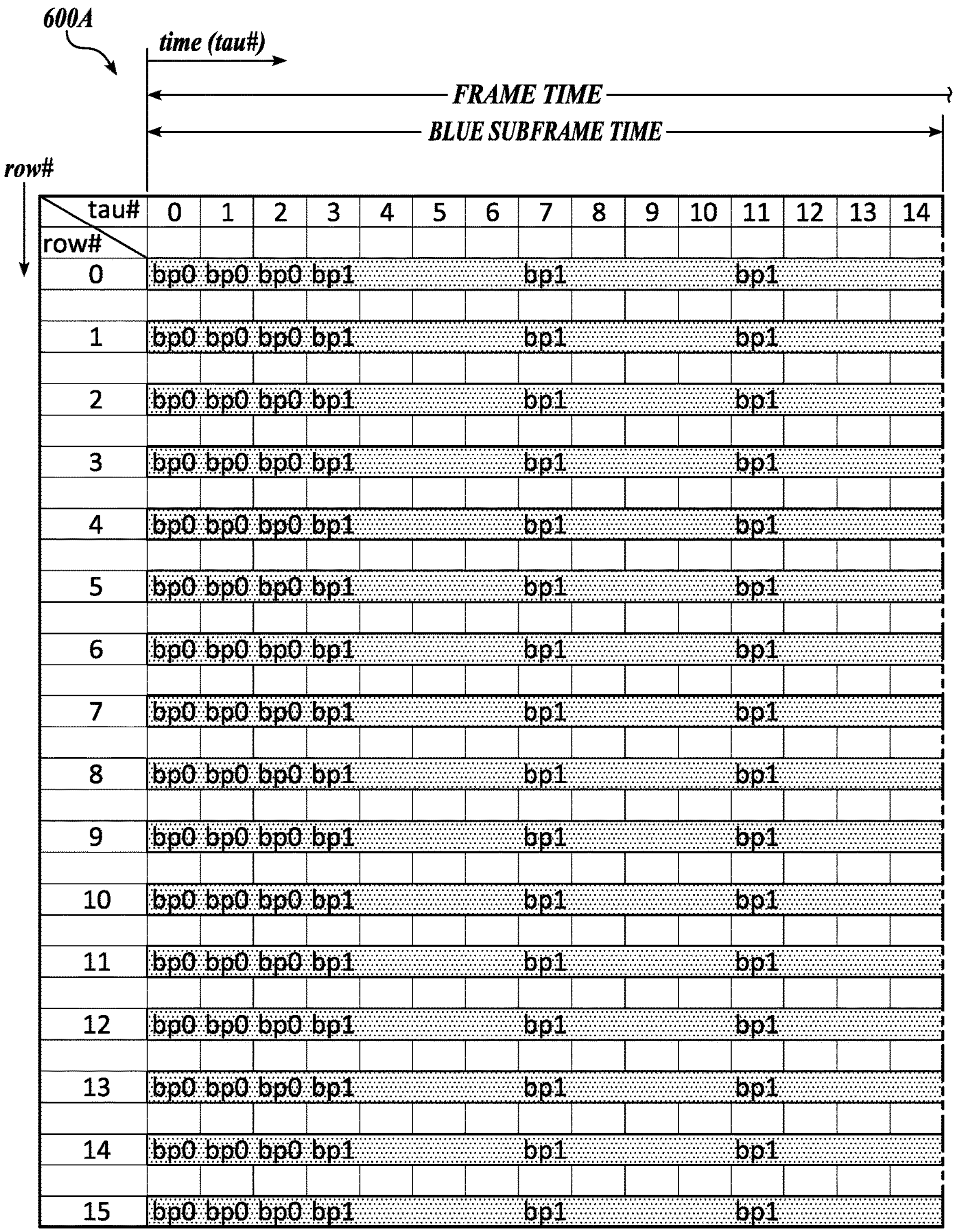
FIG. 5A is another example of a traditional color updating schedule of the bitplane generator of FIG. 1.
Figure 5A:
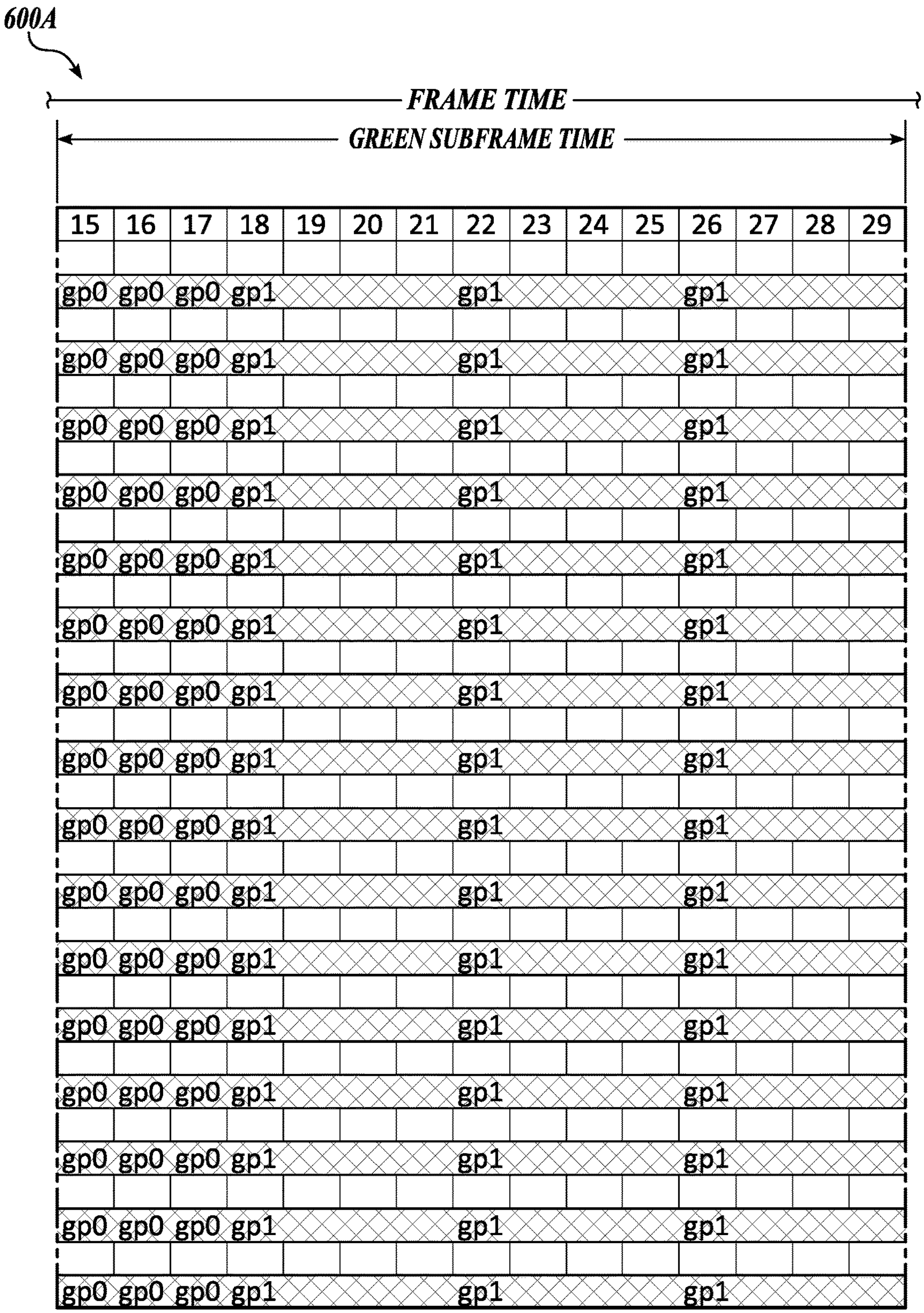
Figure 5A:
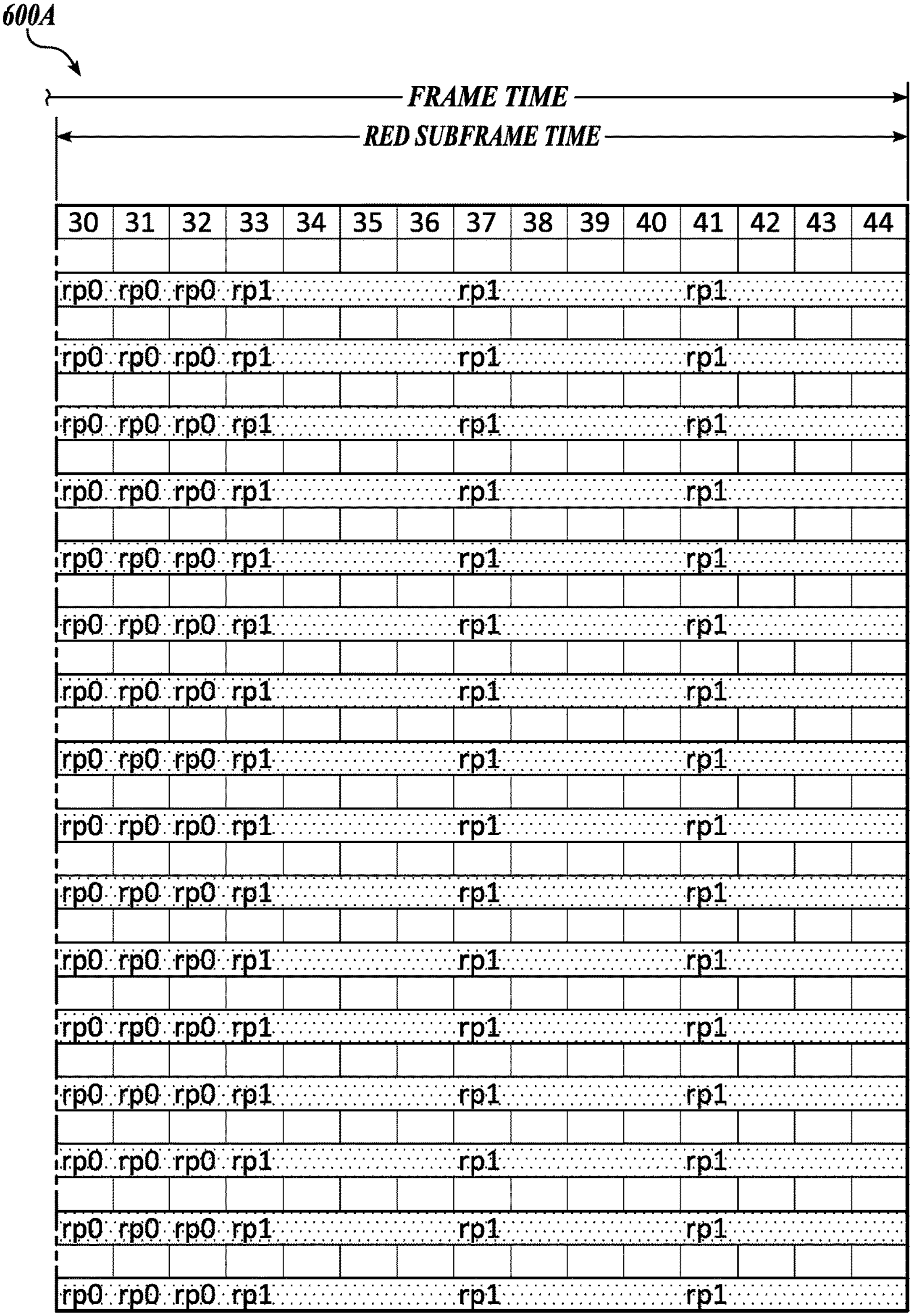

FIG. 5A is a chart of another traditional color updating schedule 600A for a micro-LED display. The color updating schedule 600A includes blue, green, and red subframes of equal size and 4-bit color depth. FIG. 5C shows an example of a waveform of a partitioned thermometer-coded PWM suitable for driving the color updating schedule 600A of FIG. 5A. The illustrated PWM is a 4-bit binary number 4'b0110 that uses LSB 2-bit values to determine how many bp0 time segments will have a value of 1. The PWM uses MSB 2-bit values to determine how many bp1 time segments will have a value of 1. In some embodiments, the PWM signal is a grayscale pulse width modulation (GPWM) signal.

Figure 5B:
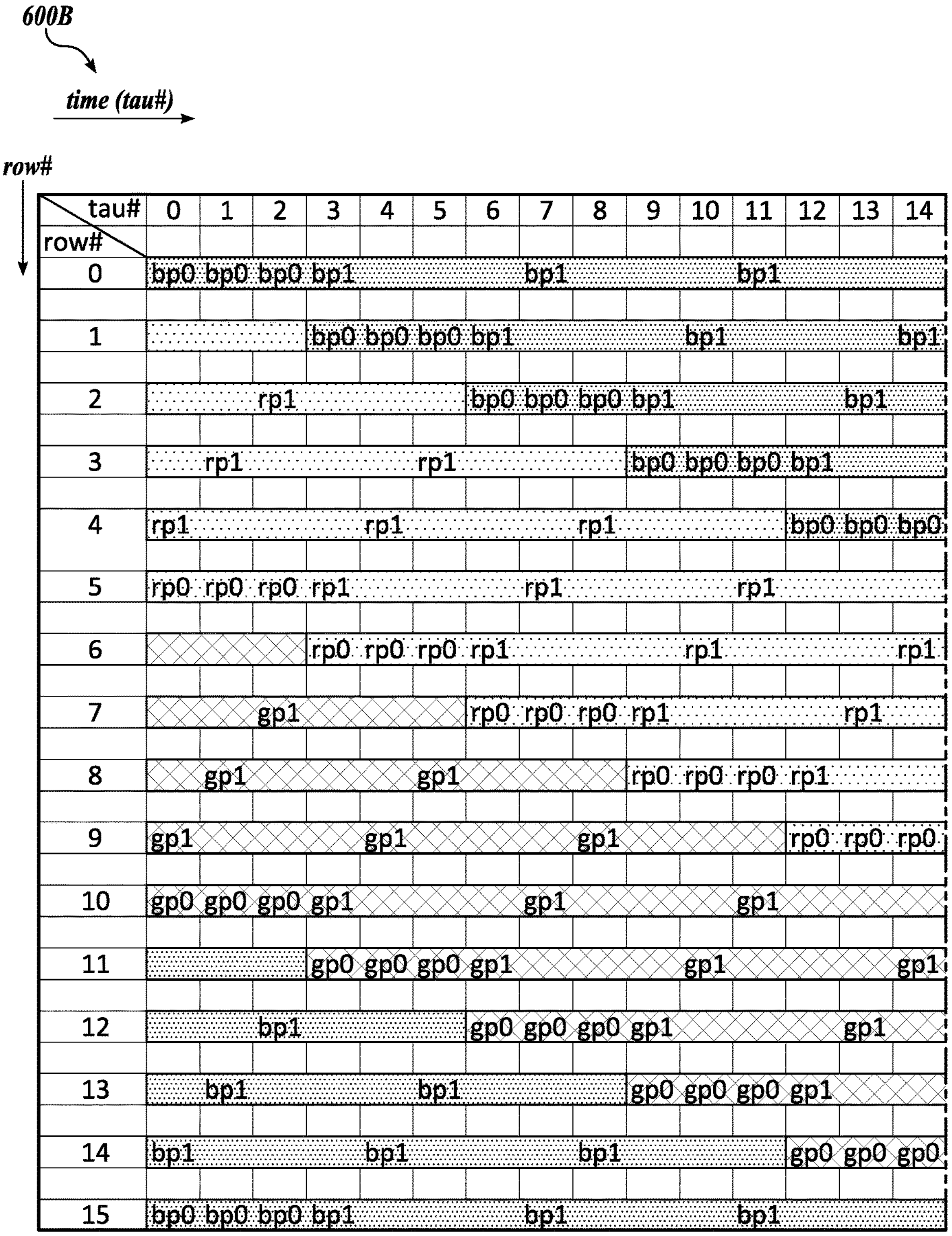
FIG. 5B is another example of a color updating schedule similar to the color updating schedule of FIG. 5A, wherein the color updating schedule implements row-shifting and frame-rotation according to another embodiment of the disclosed subject matter.
Figure 5B:
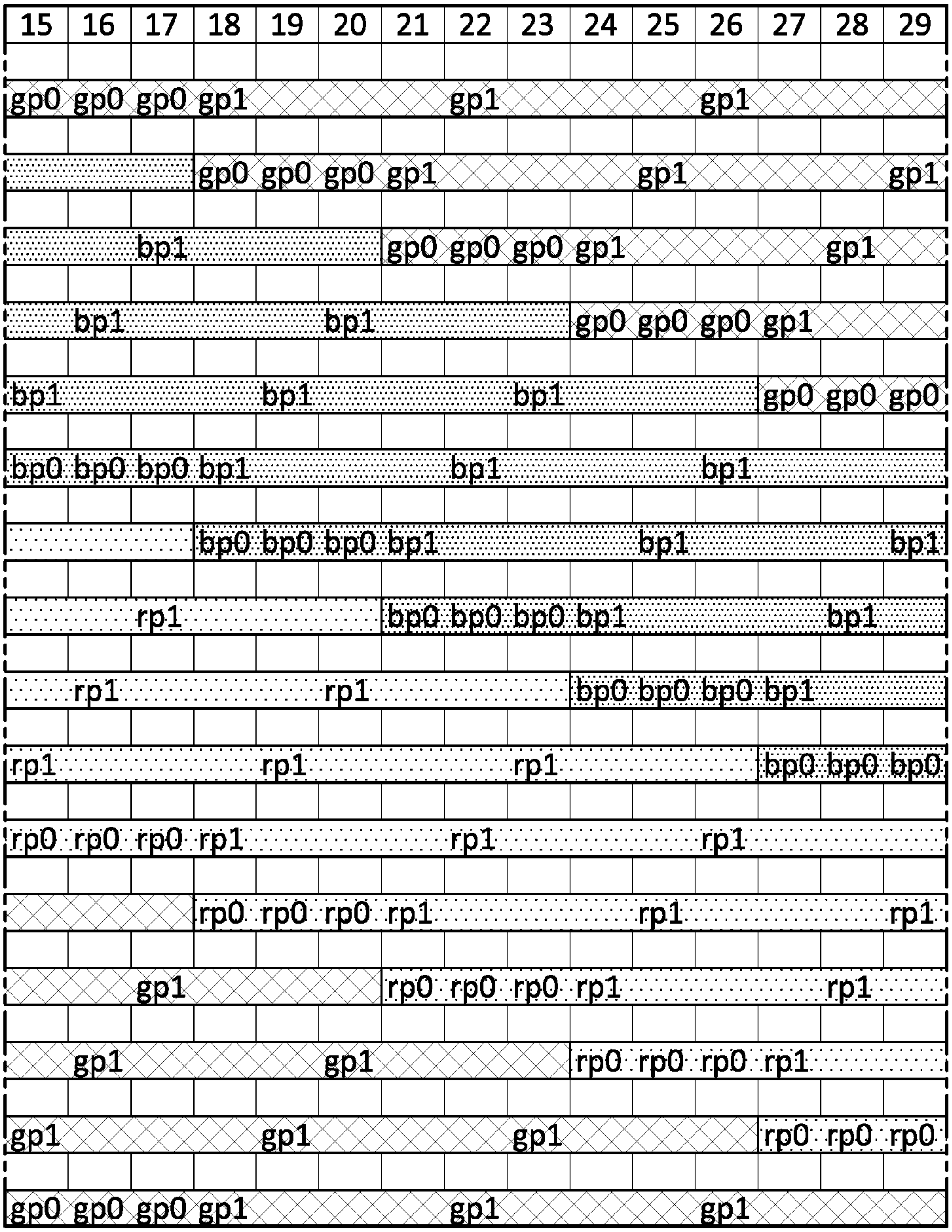
Figure 5B:
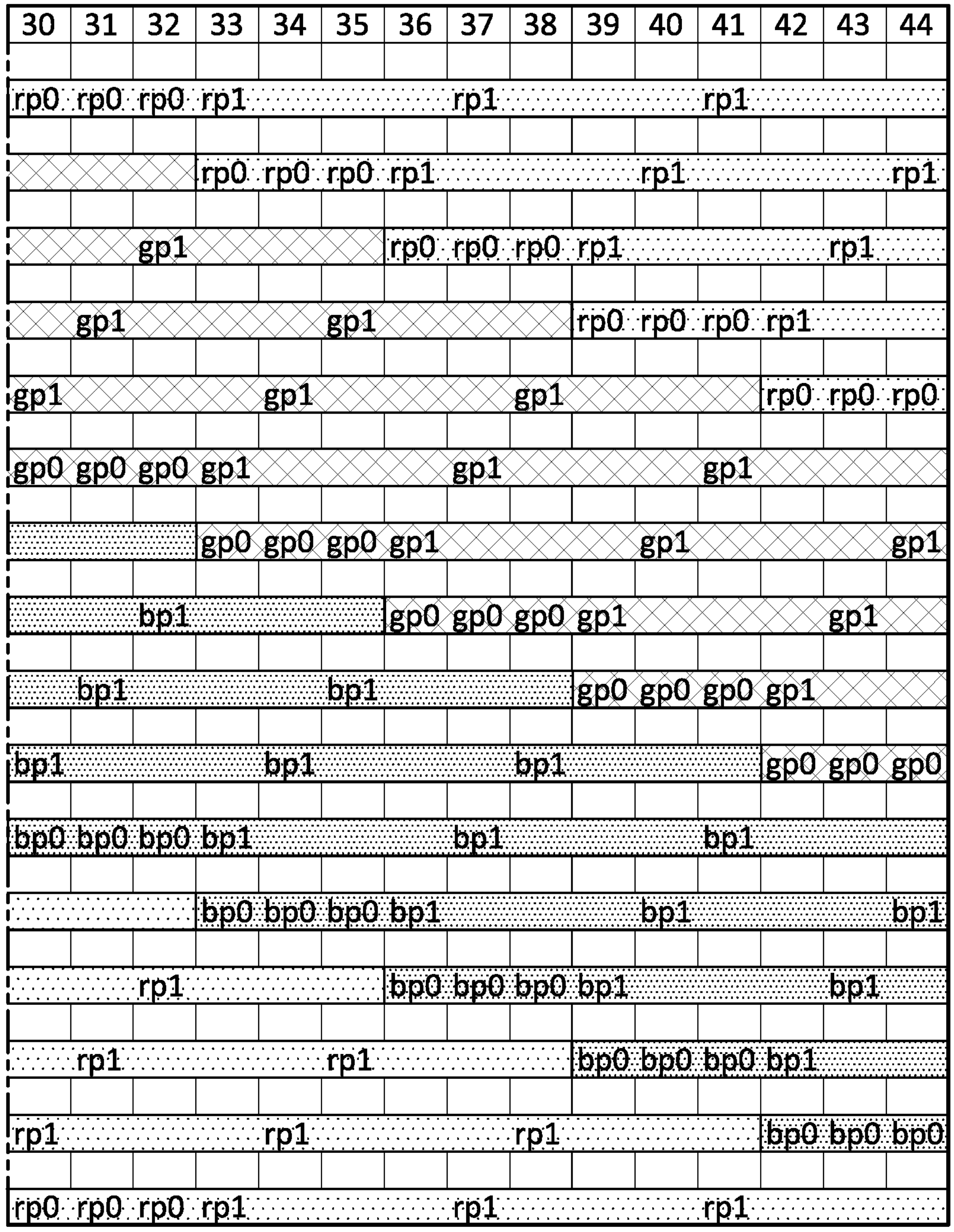
Figure 5C:
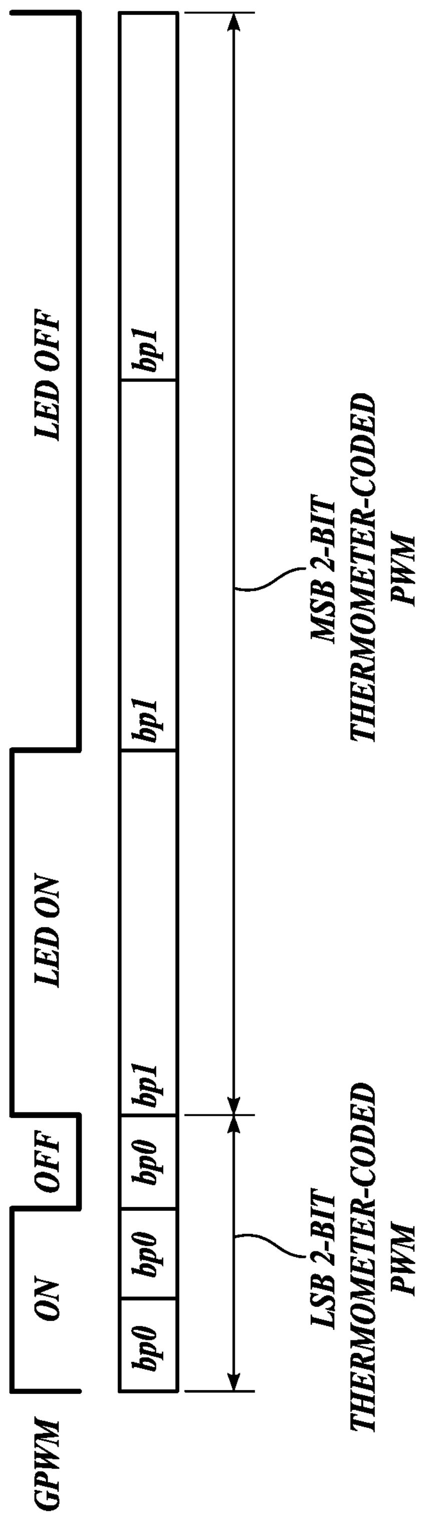
FIG. 5C is an example of a partitioned thermometer-coded PWM that drives the color updating schedule of FIG. 5B.

Turning now to FIG. 5B, a chart of an embodiment of a color updating schedule 600B for a micro-LED display according to aspects of the present disclosure is shown. Color updating schedule 600B is similar to color updating schedule 600A except that color updating schedule 600B also includes frame-shift and frame-rotate.

Figure 6A:
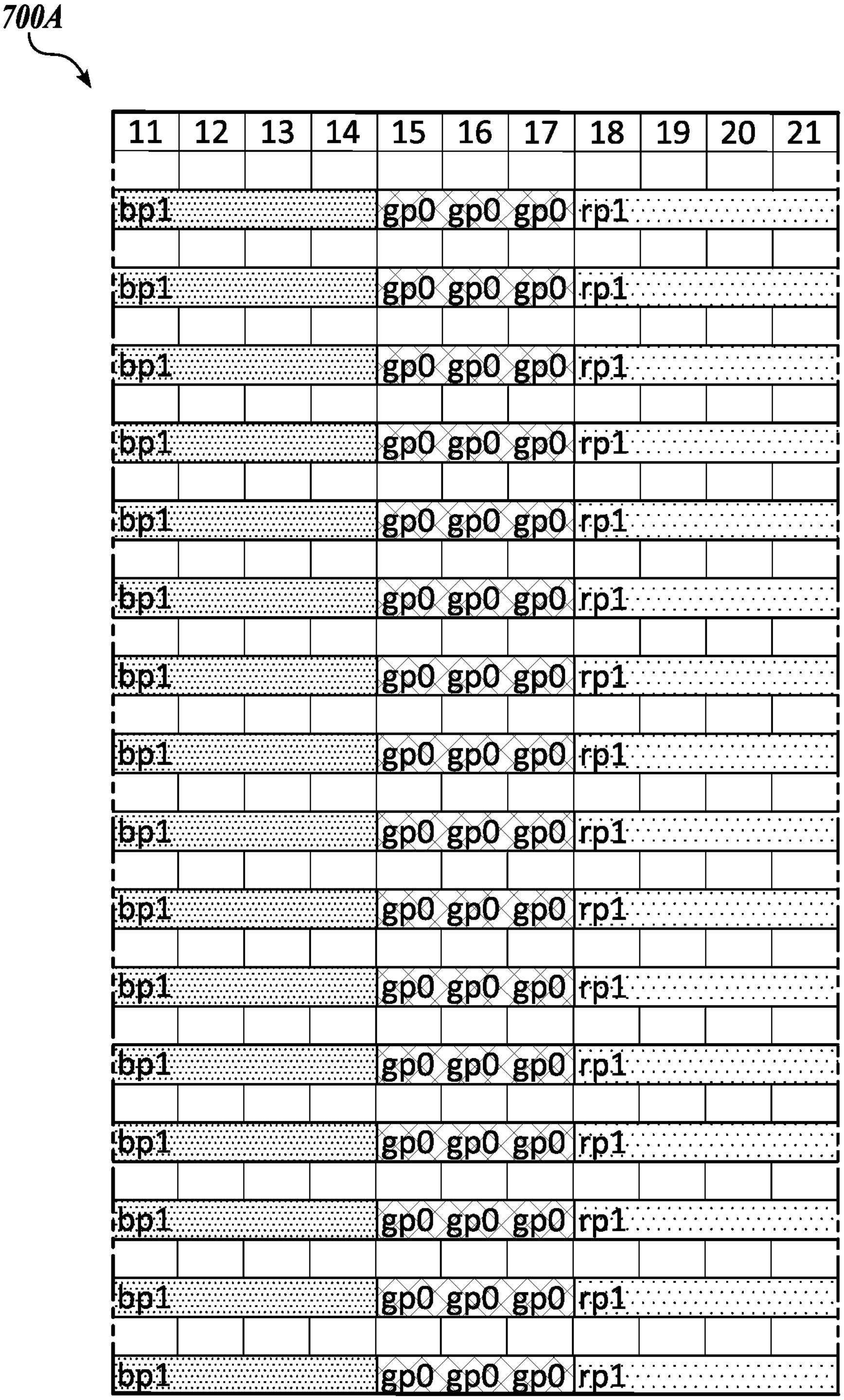
FIG. 6A is another example of a traditional color updating schedule of the bitplane generator of FIG. 1.
Figure 6A:
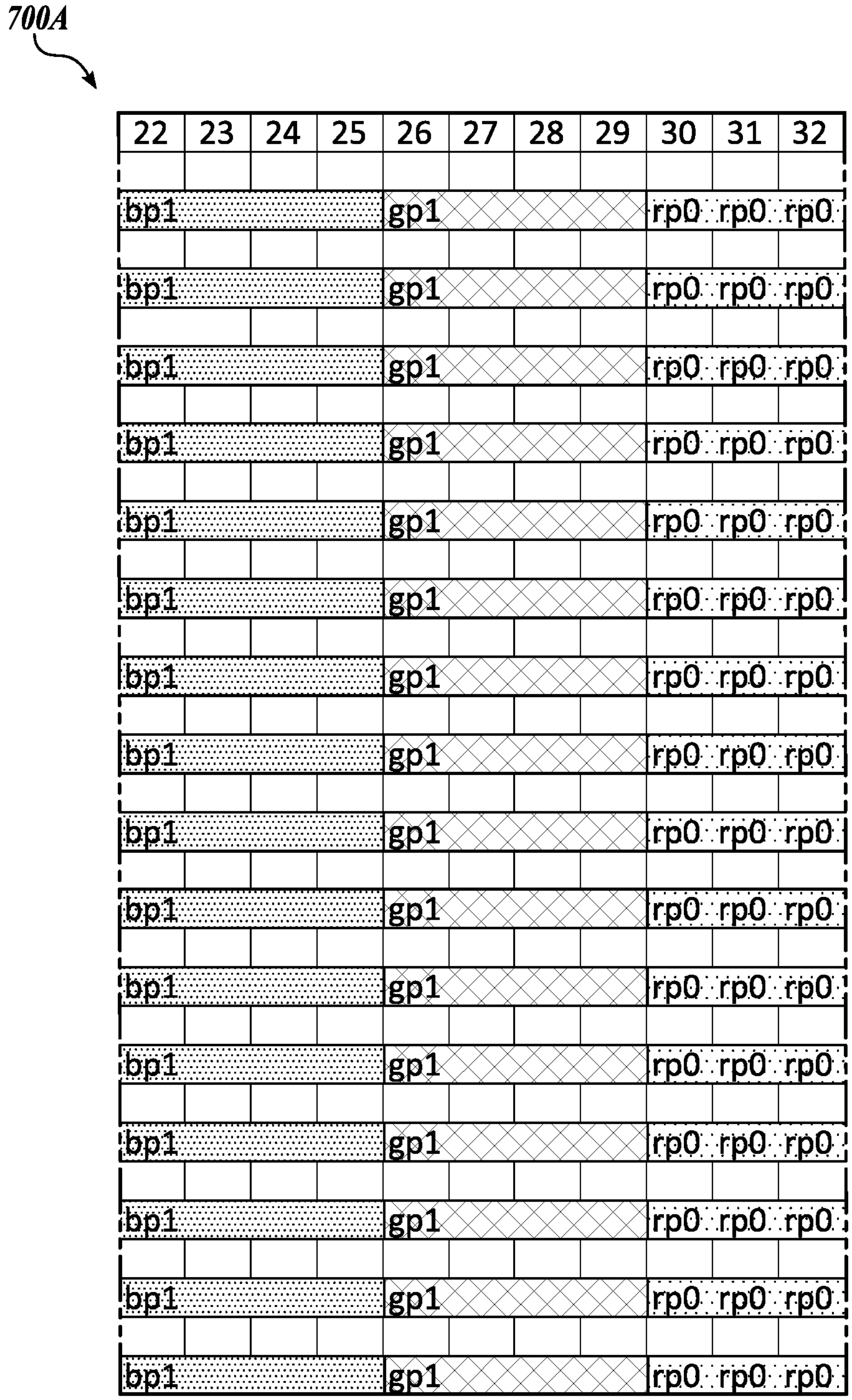
Figure 6A:
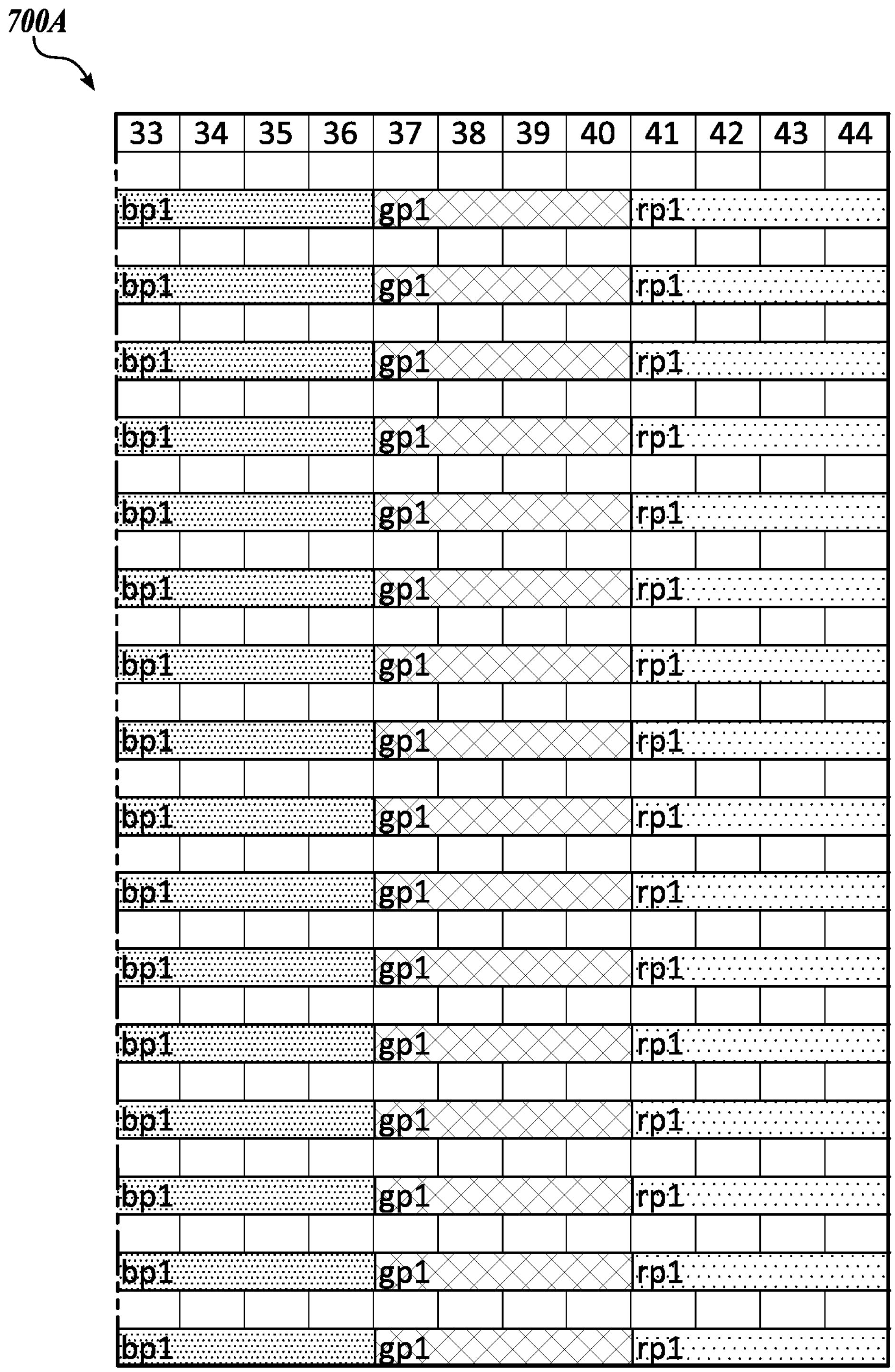

FIG. 6A is a chart of an embodiment of a color updating schedule 700A for a micro-LED display. The color updating schedule 700A is similar to the color updating schedule 600A shown in FIG. 5A but includes interleaving of the sub-colors. That is, the display of each sub-color is not limited to a particular sub-frame with only that sub-color. Instead, the sub-colors are shuffled through the entire frame period.

Figure 6B:
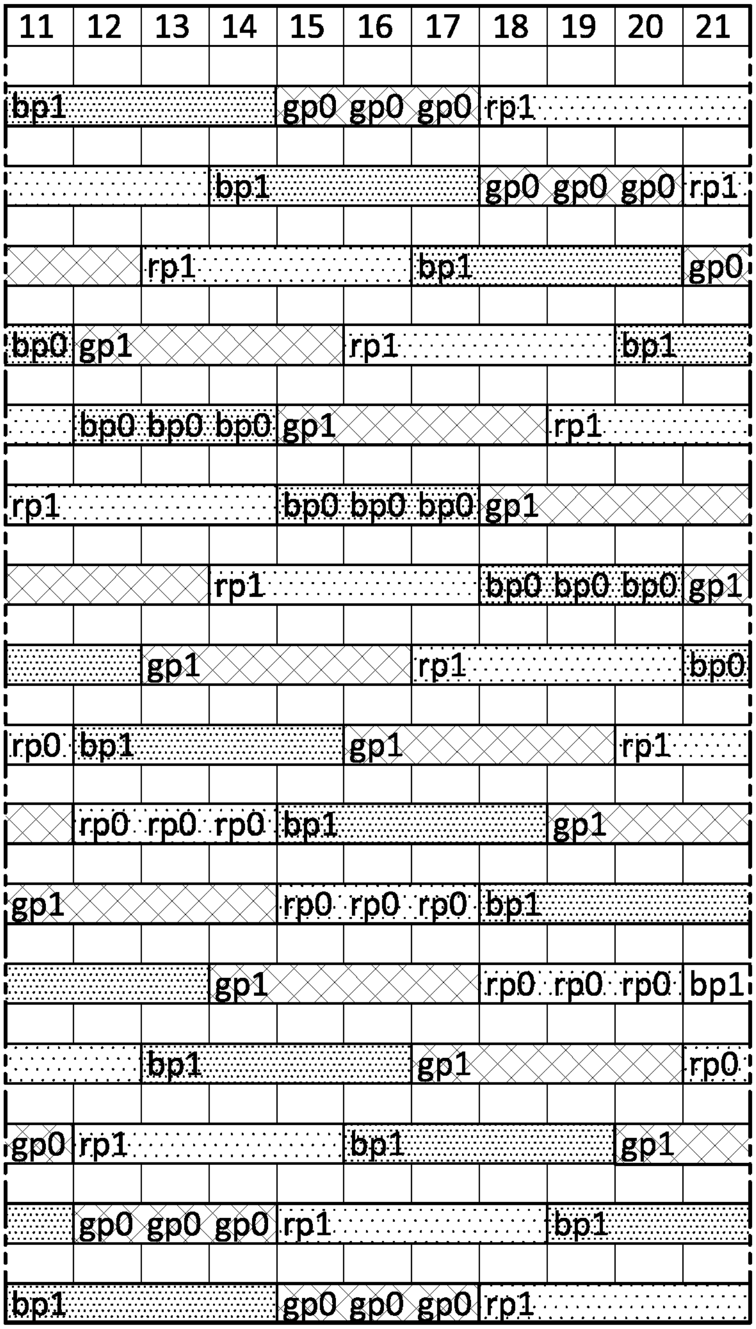
FIG. 6B is another example of a color updating schedule similar to the color updating schedule of FIG. 6A, where the color updating schedule implements row-shifting and frame-rotation according to another embodiment of the disclosed subject matter; and Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.
Figure 6B:
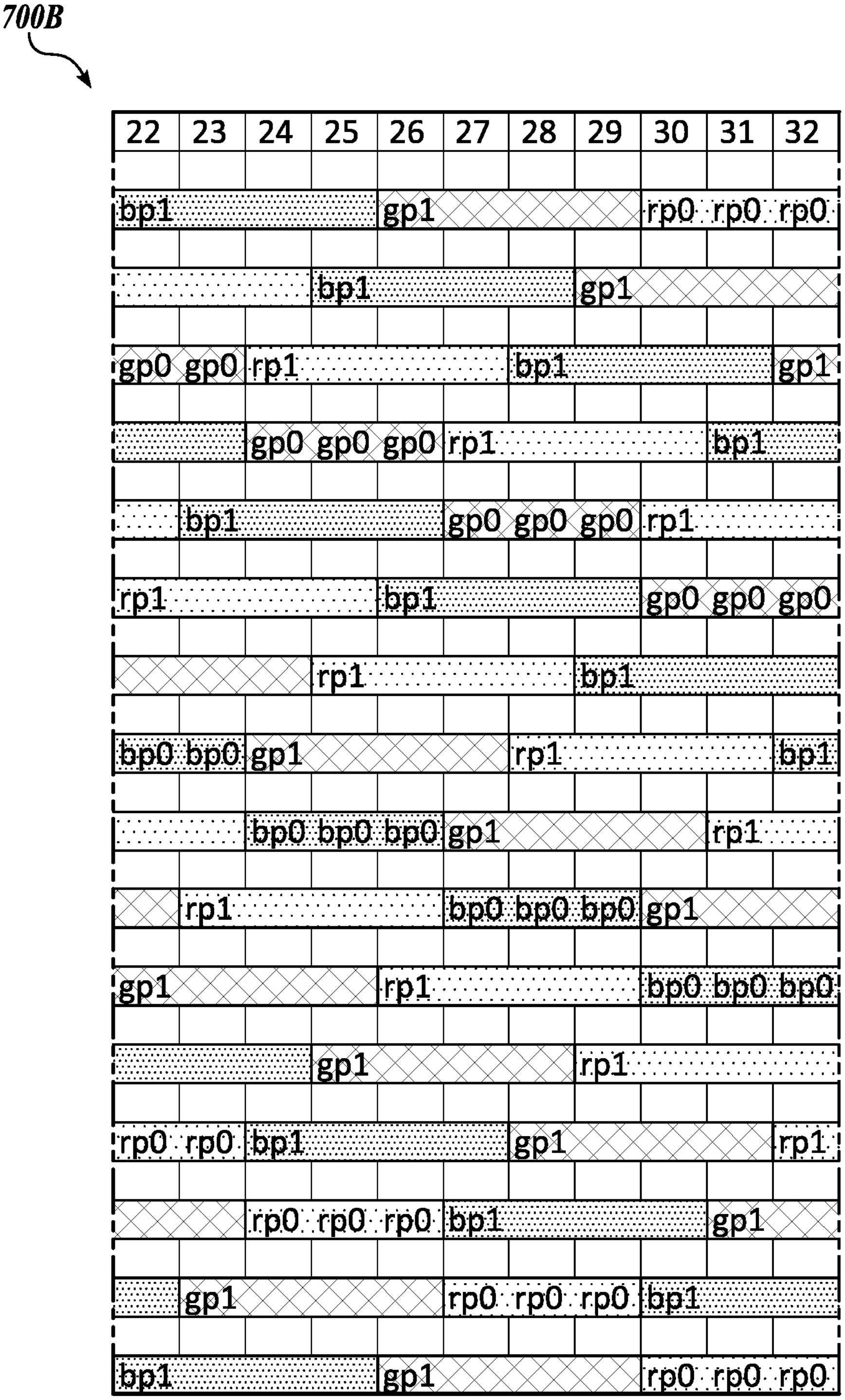
Figure 6B:
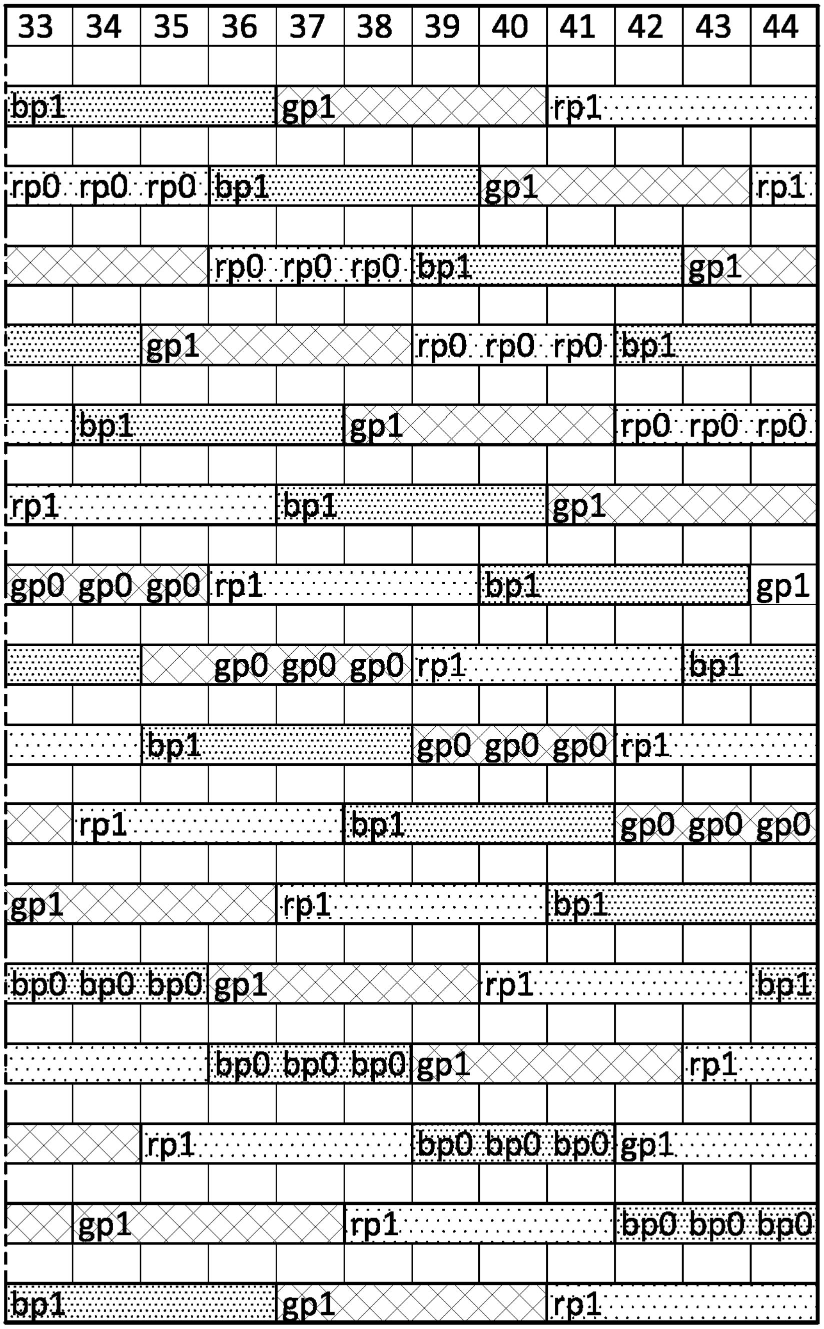

FIG. 6B shows a chart of an embodiment of a color updating schedule 700B for a micro-LED display according to aspects of the present disclosure. Color updating schedule 700B is similar to color updating schedule 700A except that color updating schedule 700B also includes frame-shift and frame-rotate.

What is claimed is:

1. A micro-LED display panel, comprising:

a pixel array comprising a plurality of pixels arranged in a plurality of rows and columns, wherein each pixel of the pixel array includes a blue LED, a green LED, and a red LED;

a frame buffer; and a bitplane generator configured to receive display data from the frame buffer and to output a color updating schedule according to the display data that updates a luminance and a color of the display data for each pixel in the pixel array during each of a plurality of time intervals that define a frame time of a frame, wherein the color updating schedule row-shifts and frame-rotates at least one row of the frame.

2. The micro-LED display panel according to claim 1, wherein the color updating schedule row-shifts each row from next of the plurality of rows to a last of the plurality of rows with respect to a respective previous row of the plurality of rows.

3. The micro-LED display panel according to claim 2, wherein each row-shifted row is frame-rotated.

4. The micro-LED display panel according to claim 2, wherein each row-shifted row is frame-rotated according to a number of time units of the corresponding row-shift.

5. The micro-LED display panel according to claim 2, wherein the frame comprises a blue subframe, a green subframe, and a red subframe.

6. The micro-LED display panel according to claim 5, wherein the blue, green, and red subframes include an equal number of the plurality of time intervals.

7. The micro-LED display panel according to claim 5, wherein at least two of the blue, green, and red subframes include a different number of the plurality of time intervals.

8. The micro-LED display panel according to claim 5, wherein at least two of the blue, green, and red subframes are displayed during each time interval of the frame.

9. The micro-LED display panel according to claim 5, wherein each of the blue, green, and red subframes are displayed during each time interval of the frame.

10. The micro-LED display panel according to claim 2, wherein the bitplane generator is configured to output a PWM signal according to the display data.

11. The micro-LED display panel according to claim 10, wherein the PWM signal is a binary grayscale PWM.

12. The micro-LED display panel according to claim 11, wherein the sub-colors in the frame are interleaved.

13. The micro-LED display panel according to claim 10, wherein the PWM signal is a partitioned thermometer-coded PWM.

14. The micro-LED display panel according to claim 10, wherein the color updating schedule includes 4-bit sub-color depth.

15. The micro-LED display panel according to claim 10, wherein the color updating schedule includes 3-bit sub-color depth and the PWM signal is binary.

16. The micro-LED display panel according to claim 2, wherein each row-shifted row is shifted by two time intervals.

17. The micro-LED display panel according to claim 2, wherein each row-shifted row is shifted by at least three time intervals.

* * * * *